(12) United States Patent
Chun et al.

(10) Patent No.: US 11,533,133 B2
(45) Date of Patent: Dec. 20, 2022

(54) METHOD FOR TRANSMITTING OR RECEIVING FRAME IN WIRELESS LAN SYSTEM AND APPARATUS THEREFOR

(71) Applicant: LG ELECTRONICS INC., Seoul (KR)

(72) Inventors: Jinyoung Chun, Seoul (KR); Jeongki Kim, Seoul (KR); Kiseon Ryu, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 16/980,798

(22) PCT Filed: Jun. 27, 2018

(86) PCT No.: PCT/KR2018/007277
§ 371 (c)(1),
(2) Date: Sep. 14, 2020

(87) PCT Pub. No.: WO2019/194361
PCT Pub. Date: Oct. 10, 2019

(65) Prior Publication Data
US 2021/0250133 A1   Aug. 12, 2021

(30) Foreign Application Priority Data

Apr. 2, 2018 (KR) .................. 10-2018-0038330
Apr. 25, 2018 (KR) .................. 10-2018-0047962
Apr. 25, 2018 (KR) .................. 10-2018-0047967

(51) Int. Cl.
*H04L 1/18* (2006.01)
*H04W 56/00* (2009.01)
(Continued)

(52) U.S. Cl.
CPC .......... *H04L 1/1819* (2013.01); *H04L 1/0003* (2013.01); *H04W 56/001* (2013.01); *H04W 84/12* (2013.01)

(58) Field of Classification Search
CPC ... H04L 1/1819; H04L 1/0003; H04W 56/001
See application file for complete search history.

(56) References Cited

U.S. PATENT DOCUMENTS

2012/0327915 A1   12/2012   Kang et al.
2013/0308464 A1   11/2013   Park et al.
(Continued)

OTHER PUBLICATIONS

PCT International Application No. PCT/KR2018/007277, International Search Report dated Nov. 28, 2018, 2 pages.

*Primary Examiner* — Walli Z Butt
*Assistant Examiner* — Ryan C Kavleski
(74) *Attorney, Agent, or Firm* — Lee Hong Degerman Kang Waimey

(57) ABSTRACT

A method for an STA to transmit or receive a frame in a WLAN, according to one embodiment of the present invention, comprises the steps of: receiving a first HARQ trigger frame that triggers transmission of an A-PHDU into which PHDUs that are PHY data transmission units for a HARQ process are combined; transmitting at least one PHDU within the A-PHDU on the basis of the first HARQ trigger frame at the timing designated for the STA; and retransmitting the at least one PHDU or transmitting a new PHDU according to reception of a second HARQ trigger frame, wherein the first HARQ trigger frame includes timing offset information between the STA and another STA transmitting the PHDU within the A-PHDU, and the STA may determine the timing designated for the STA by using the timing offset information.

4 Claims, 36 Drawing Sheets

(51) Int. Cl.
 *H04L 1/00* (2006.01)
 *H04W 84/12* (2009.01)

(56) References Cited

U.S. PATENT DOCUMENTS

| | | |
|---|---|---|
| 2015/0063250 A1 | 3/2015 | Lahetkangas et al. |
| 2017/0230149 A1* | 8/2017 | Wang .................... H04L 1/1664 |
| 2017/0331602 A1 | 11/2017 | Hugl et al. |
| 2017/0373801 A1* | 12/2017 | Bergström ............ H04L 1/1628 |
| 2019/0068268 A1* | 2/2019 | Zhang ................... H04L 1/1812 |

* cited by examiner

FIG. 5
(a) 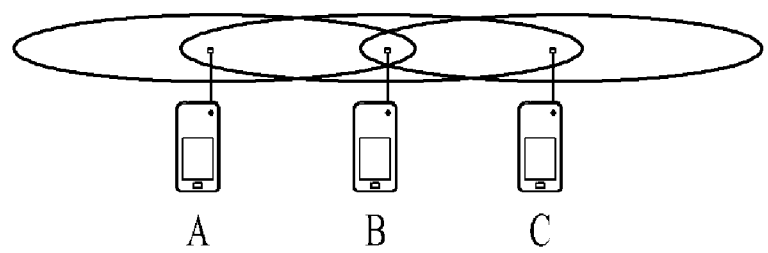
(b) 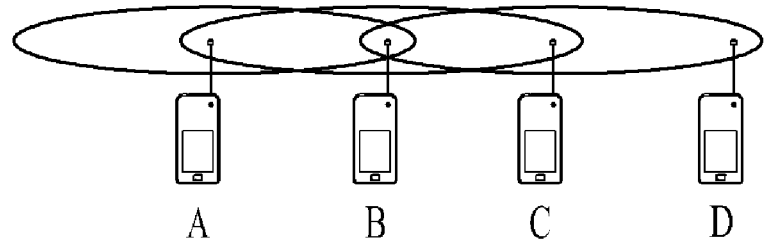

FIG. 6
(a) 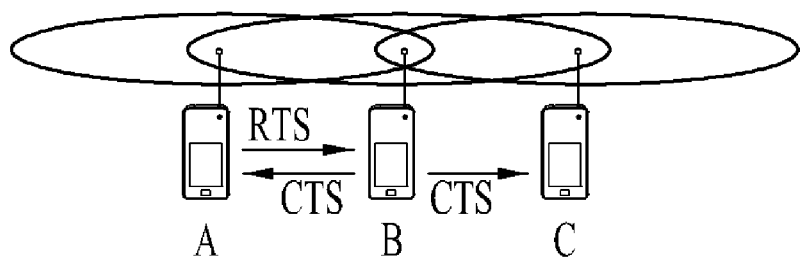
(b) 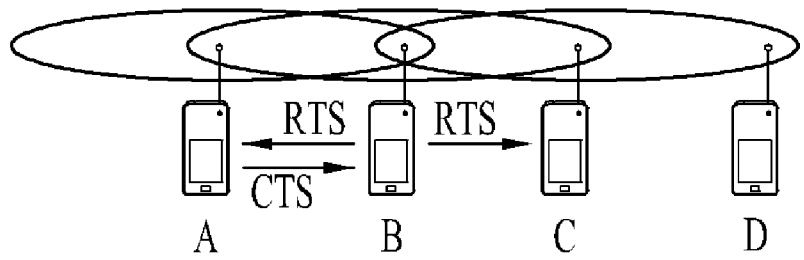

FIG. 17

| Frame Control | Duration | RA | TA | Common Info | User Info | ... | User Info | Padding | FCS |
|---|---|---|---|---|---|---|---|---|---|
| 2 | 2 | 6 | 6 | 8 or more | 5 or more | | 5 or more | variable | 4 |

Octets:

(a) Trigger frame

| B0  B3 | B4  B15 | B16 | B17 | B17  B19 | B20  B21 | B22 | B23  B25 |
|---|---|---|---|---|---|---|---|
| Trigger Type | Length | Cascade Indication | CS Required | BW | GI And LTF Type | MU-MIMO LTF Mode | Number of HE-LTF Symbols And Mid-amble Periodicity |
| 4 | 12 | 1 | 1 | 2 | 2 | 1 | 3 |

| B26 | B27 | B28  B33 | B34  B36 | B37  B52 | B53 | B54  B62 | B63 |
|---|---|---|---|---|---|---|---|
| STBC | LDPC Extra Symbol Segment | AP TX Power | Packet Extension | Spatial Reuse | Doppler | HE-SIG-A Reserved | Trigger Dependent Common Info |
| 1 | 1 | 6 | 3 | 16 | 1 | 9 | variable |

Bits:

(b) Common Info field of Trigger frame

| B0  B11 | B12  B19 | B20 | B21  B24 | B25 | B26  B31 | B32  B38 | B39 | |
|---|---|---|---|---|---|---|---|---|
| AID 12 | RU Allocation | Coding Type | MCS | DCM | SS Allocation/ Random Access RU Information | Target RSSI | Reserved | Trigger Dependent User Info |
| 16 | 8 | 1 | 4 | 1 | 6 | 7 | 1 | variable |

Bits:

(c) User Info field of Trigger frame

FIG. 18

| AID 11 | Reserved | RU Allocation | Coding Type | MCS | DCM | SS Allocation | Target RSSI | Reserved | Trigger dependent User Info |
|---|---|---|---|---|---|---|---|---|---|
| Bits: 11 | 1 | 8 | 1 | 4 | 1 | 6 | 7 | 1 | variable |

FIG. 22
(a)
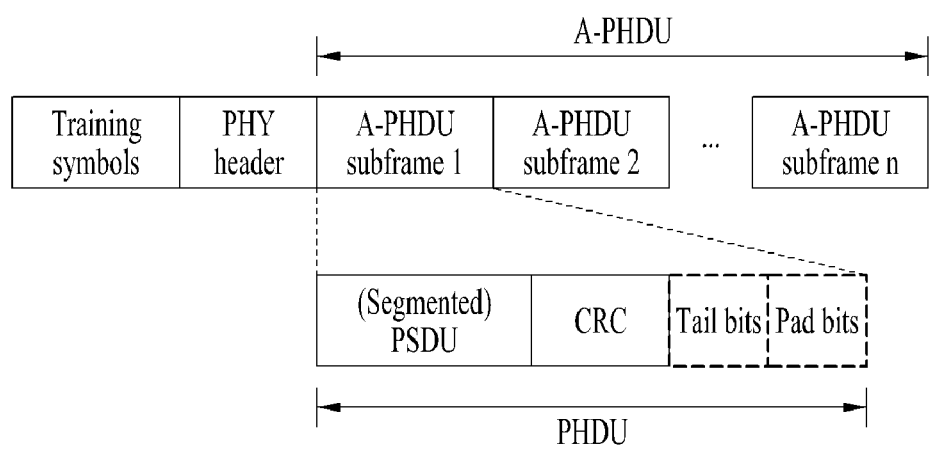
(b)
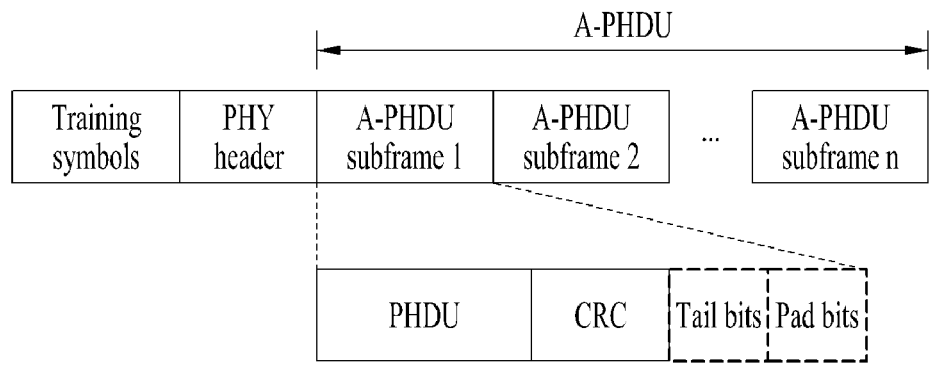
(c)

FIG. 23

| PHDU 1 | ~~PHDU 2~~ | ~~PHDU 3~~ |   | PHDU 2' | ~~PHDU 3'~~ |   | PHDU 3' |
|        | A | N | N |   | A | N |   | A |

FIG. 25
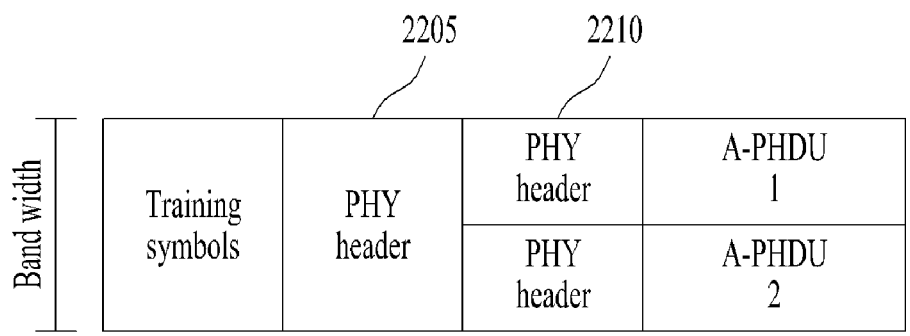
(a)
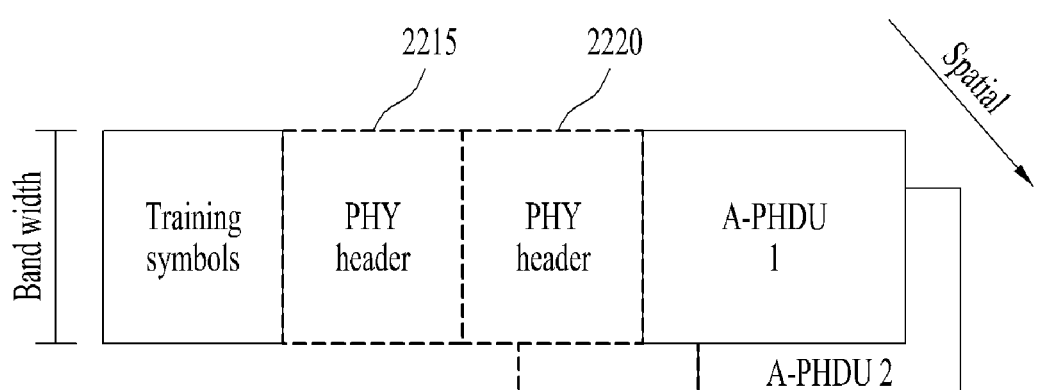
(b)

FIG. 28

| HARQ-STF | HARQ-LTF | A-PHDU |

METHOD FOR TRANSMITTING OR RECEIVING FRAME IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/007277, filed on Jun. 27, 2018, which claims the benefit of earlier filing date and right of priority to Korean Application Nos. 10-2018-0038330, filed on Apr. 2, 2018, 10-2018-0047962, filed on Apr. 25, 2018, and 10-2018-0047967, filed on Apr. 25, 2018, the contents of which are all hereby incorporated by reference herein in their entirety.

BACKGROUND OF THE DISCLOSURE

Field of the Disclosure

Present disclosure relates to frame transmission and reception in a wireless LAN, and more specifically, to a method for transmitting/receiving frames based on a HARQ process and a device therefor.

Related Art

Institute of Electrical and Electronics Engineers (IEEE) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802.11ac which supports eight spatial streams to support up to 1 Gbit/s is under discussion.

An object of the present disclosure is to provide a frame configuration, a physical layer operating method, and STA/AP devices for transmitting/receiving frames based on a HARQ process in a wireless LAN.

The present disclosure is not limited to the aforementioned technical object and can other technical objects can be inferred form embodiments of the present disclosure.

SUMMARY

To accomplish the technical object, a method for transmitting/receiving frames by a station (STA) in a wireless LAN (WLAN) according to one aspect of the present disclosure may include: receiving a first hybrid automatic repeat request (HARQ) trigger frame for triggering transmission of an aggregated PHY HARQ data unit (A-PHDU) corresponding to an aggregate of PHDUs that are physical layer (PHY) data transmission units for a HARQ process; transmitting at least one PHDU at a timing designated for the STA in the A-PHDU based on the first HARQ trigger frame; and retransmitting the at least one PHDU or transmitting a new PHDU upon reception of a second HARQ trigger frame, wherein the first HARQ trigger frame includes information on a timing offset between the STA and other STAs transmitting PHDUs in the A-PHDU, and the STA determines the timing designated for the STA using the timing offset information.

To accomplish the technical object, a station (STA) for transmitting/receiving frames according to another aspect of the present disclosure may include: a transceiver; and a processor configured to receive a first HARQ trigger frame for triggering transmission of an A-PHDU corresponding to an aggregate of PHDUs that are PHY data transmission units for a HARQ process through the transceiver, to transmit at least one PHDU at a timing designated for the STA in the A-PHDU based on the first HARQ trigger frame, and to retransmit the at least one PHDU or transmit a new PHDU upon reception of a second HARQ trigger frame, wherein the first HARQ trigger frame includes information on a timing offset between the STA and other STAs transmitting PHDUs in the A-PHDU, and the processor determines the timing designated for the STA using the timing offset information.

The STA may receive a synchronization report polling frame for requesting synchronization reports from the STA and the other STAs and transmit a synchronization report frame.

The timing offset between the STA and the other STAs may be determined based on differences of timing of arrival of the synchronization report frame transmitted by the STA and synchronization report frames transmitted by the other STAs at an access point (AP).

The at least one PHDU transmitted by the STA and the PHDUs transmitted by the other STAs may be time-division-multiplexed in the A-PHDU.

A HARQ-short training field (STF) and a HARQ-long training field (LTF) may be attached to the head of each of the at least one PHDU transmitted by the STA.

The STA may transmit a short PHY block prior to transmission of the at least one PHDU after reception of the first HARQ trigger frame.

Retransmission of the at least one PHDU may be requested through the second HARQ trigger frame when the short PHY block has been successfully transmitted but transmission of the at least one PHDU has failed.

Retransmission of the at least one PHDU may not be requested through the second HARQ trigger frame when transmission of the short PHY block has failed even when transmission of the at least one PHDU has failed.

The short PHY block may be encoded through a modulation and coding scheme (MCS) lower than an MCS used for the at least one PHDU.

To accomplish the technical object, a method for transmitting/receiving frames by an AP in a WLAN according to another aspect of the present disclosure may include: transmitting a first HARQ trigger frame for triggering transmission of an A-PHDU corresponding to an aggregate of PHDUs that are PHY data transmission units for a HARQ process; respectively receiving PHDUs of the A-PHDU from a plurality of STAs based on the first HARQ trigger frame; and when decoding of a specific PHDU from among the PHDUs has failed, determining whether to request retransmission of the specific PHDU from an STA corresponding to the specific PHDU, wherein the first HARQ trigger frame includes information on a timing offset between the plurality of STAs transmitting PHDUs in the A-PHDU.

To accomplish the technical object, an access point (AP) for transmitting/receiving frames according to another aspect of the present disclosure may include: a transceiver; and a processor configured to transmit a first HARQ trigger frame for triggering transmission of an A-PHDU corresponding to an aggregate of PHDUs that are PHY data transmission units for a HARQ process through the transceiver, to respectively receive PHDUs of the A-PHDU from a plurality of STAs based on the first HARQ trigger frame, and when decoding of a specific PHDU from among the PHDUs has failed, determining whether to request retransmission of the specific PHDU from an STA corresponding to the specific PHDU, wherein the first HARQ trigger frame includes information on a timing offset between the plurality of STAs transmitting PHDUs in the A-PHDU.

The AP may transmit a synchronization report polling frame for requesting synchronization reports from the plurality of STAs and receive synchronization report frames from the plurality of STAs. The timing offset information between the plurality of STAs may be determined based on differences of timing of arrival of the synchronization report frames from the plurality of STAs at the AP.

The AP may receive a short PHY block from each STA prior to reception of the A-PHDU after transmission of the first HARQ trigger frame.

The AP may request retransmission of the specific PHDU when the short PHY block of the corresponding STA has been successfully received but reception of the specific PHDU has failed.

The AP may not request retransmission of the specific PHDU when reception of the short PHY block of the corresponding STA has failed even when reception of the specific PHDU has failed.

A modulation and coding scheme (MCS) lower than an MCS used for a corresponding PHDU may be applied to the short PHY block.

Advantageous Effects

According to one embodiment of the disclosure, it is possible to accurately and efficiently perform frame transmission and retransmission by newly defining a PHDU to which encoding/decoding and a CRC are individually applied in a physical layer and by performing an HARQ process in PHDUs.

In addition to the foregoing technical effect, other technical effects may be inferred from embodiments of the present disclosure.

BRIEF DESCRIPTION OF THE DRAWINGS

FIG. 5 illustrates a hidden node and an exposed node.

FIG. 6 illustrates RTS and CTS.

FIG. 17 illustrates an example of a trigger frame format.

FIG. 18 illustrates an example of a user information field of a trigger frame.

FIG. 22 illustrates PHDUs according to embodiments of the present disclosure.

FIG. 23 is a diagram for describing a HARQ transmission and retransmission procedure performed in units of PHDU according to an embodiment of the present disclosure.

FIG. 25 illustrates an MU A-PHDU according to an embodiment of the present disclosure.

FIG. 28 illustrates HARQ-STF/LTF of a UL A-PHDU transmitted from one STA.

DESCRIPTION OF EXEMPLARY EMBODIMENTS

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the present disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
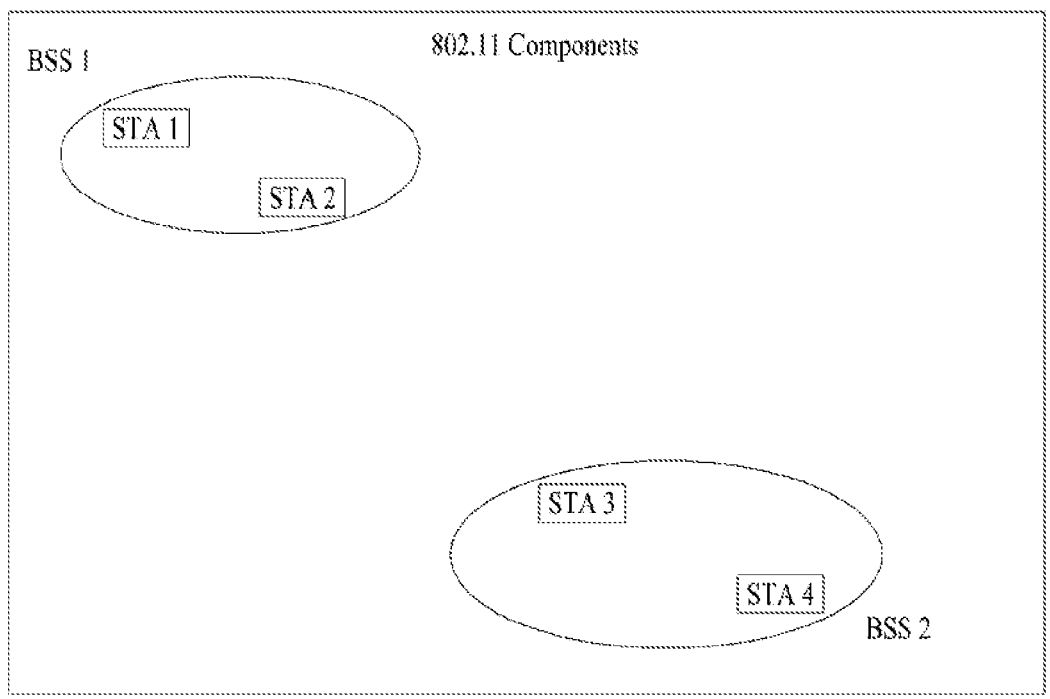
FIG. 1 illustrates an exemplary configuration of a WLAN system.

FIG. 1 illustrates an exemplary configuration of a WLAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
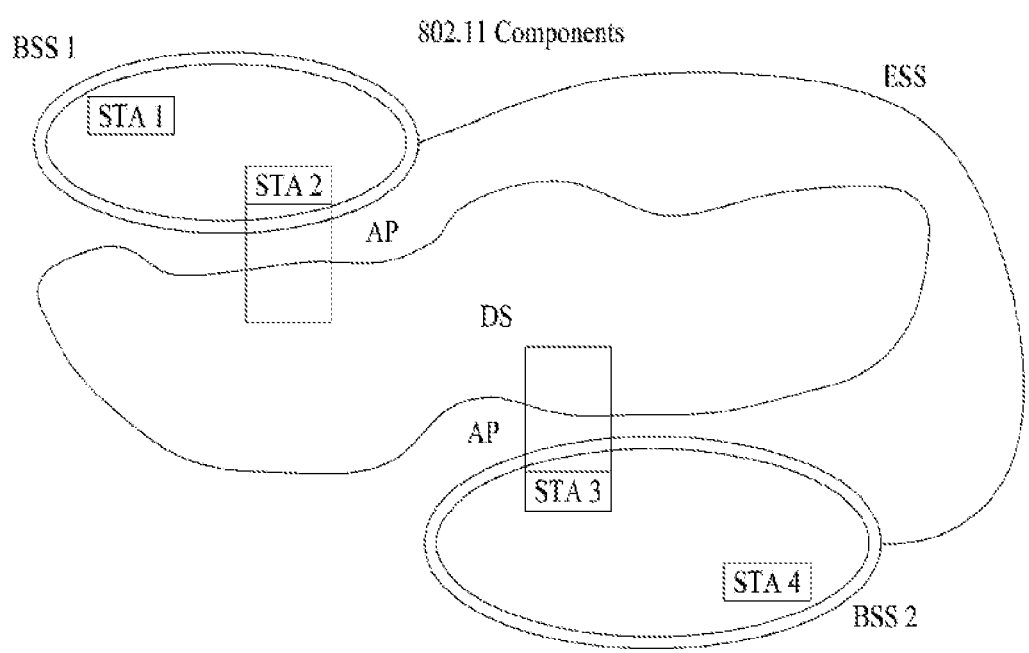
FIG. 2 illustrates another exemplary configuration of a WLAN system.

FIG. 2 illustrates another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a PLCP (Physical Layer Convergence Procedure) entity, a PMD (Physical Medium Dependent) entity, and the like. The MAC sublayer and PHY conceptually include management entities called an MLME (MAC sublayer Management Entity) and a PLME (Physical Layer Management Entity), respectively. These entities provide a layer management service interface that executes a layer management function.

In order to provide correct MAC operation, an SME (Station Management Entity is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME_SAP (Service Access Point). Further, various PLME_GET/SET primitives may be exchanged between PLME and SME via PLME_SAP and between MLME and PLME via MLME-PLME_SAP.

Link Setup Process

Figure 3:
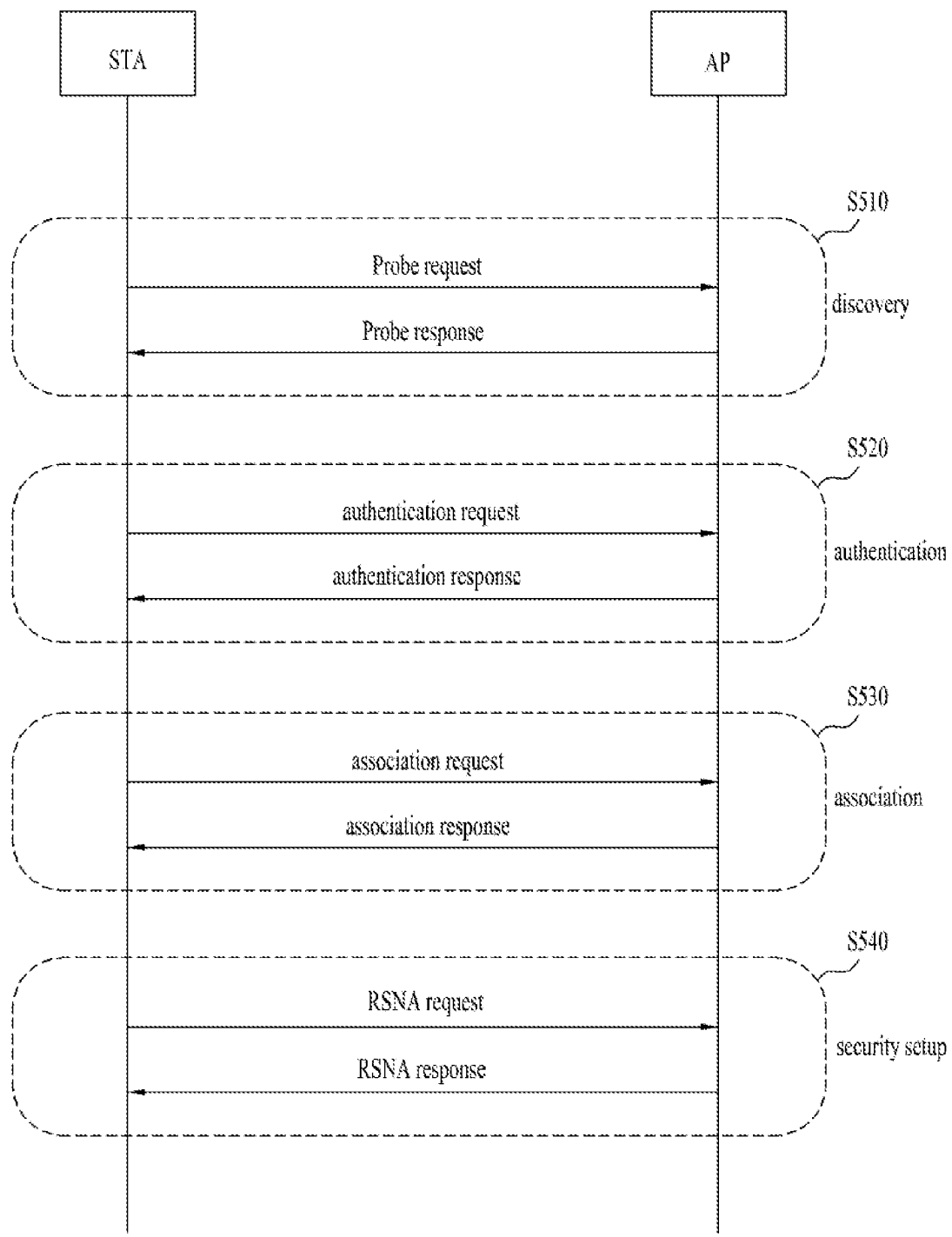
FIG. 3 illustrates a general link setup process.

FIG. 3 illustrates a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through an RSNA (Robust Security Network Association) request/response, the authentication process of step S520 may also be referred to as a first authentication process and the security setup process of step S540 may also be simply referred to as an authentication process.

The security setup process of step S540 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention-free period (CFP).

Figure 4:
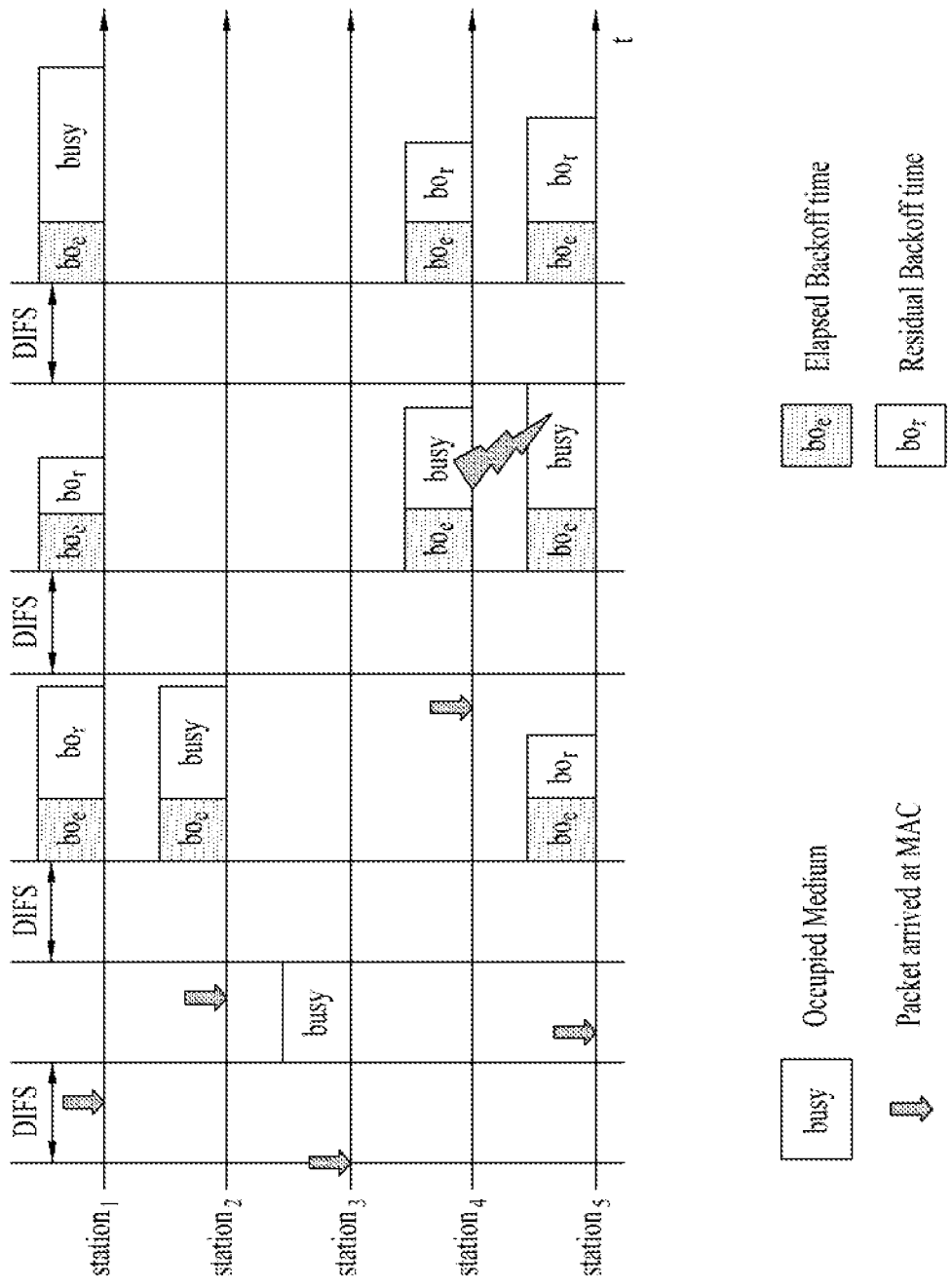
FIG. 4 illustrates a backoff process.

FIG. 4 illustrates a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

FIG. 5 illustrates a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STAB. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

FIG. 6 illustrates RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. Assume that both the STA A and the STA C attempt to transmit data to the STAB. If the STA A transmits the RTS to the STAB, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STAB and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 7:
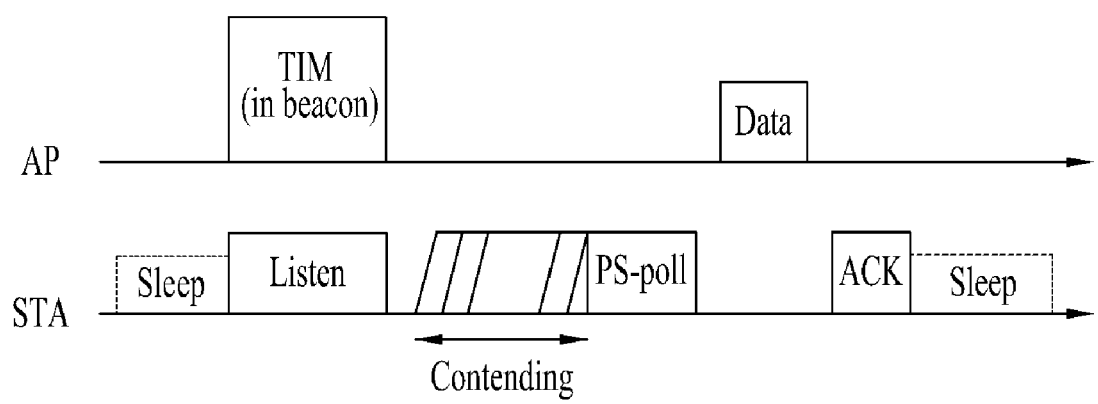
FIG. 7 to FIG. 9 illustrate an operation of an STA which receives a TIM.
Figure 8:
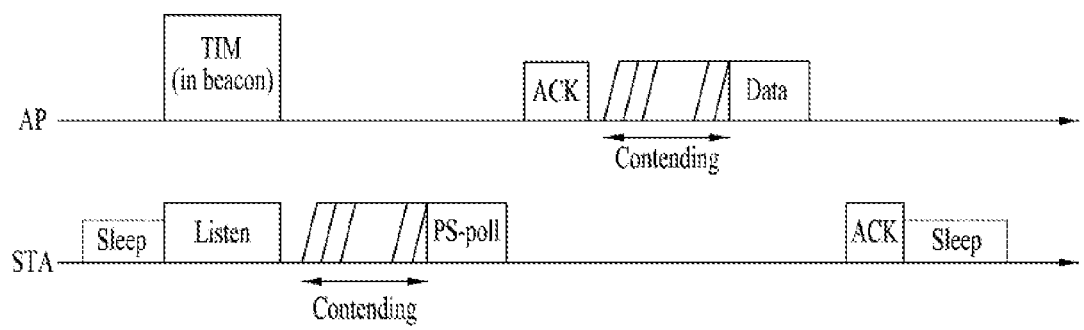
Figure 9:
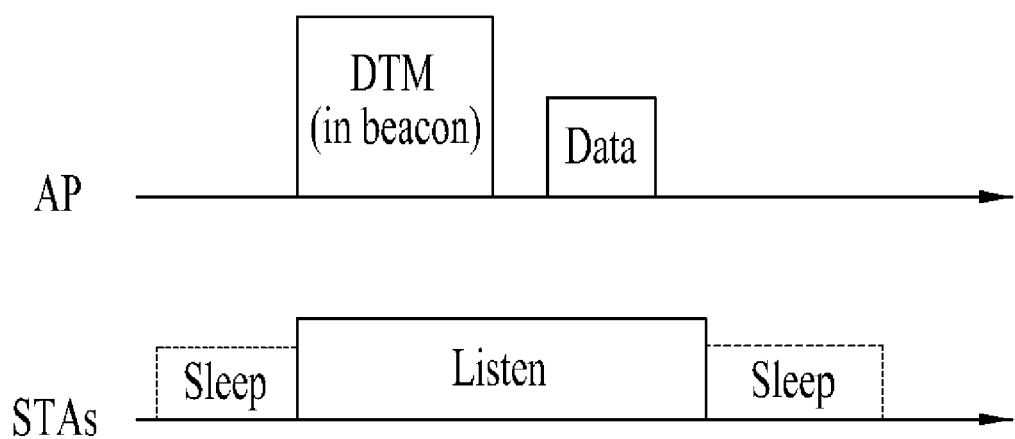

FIG. 7 to FIG. 9 illustrate an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
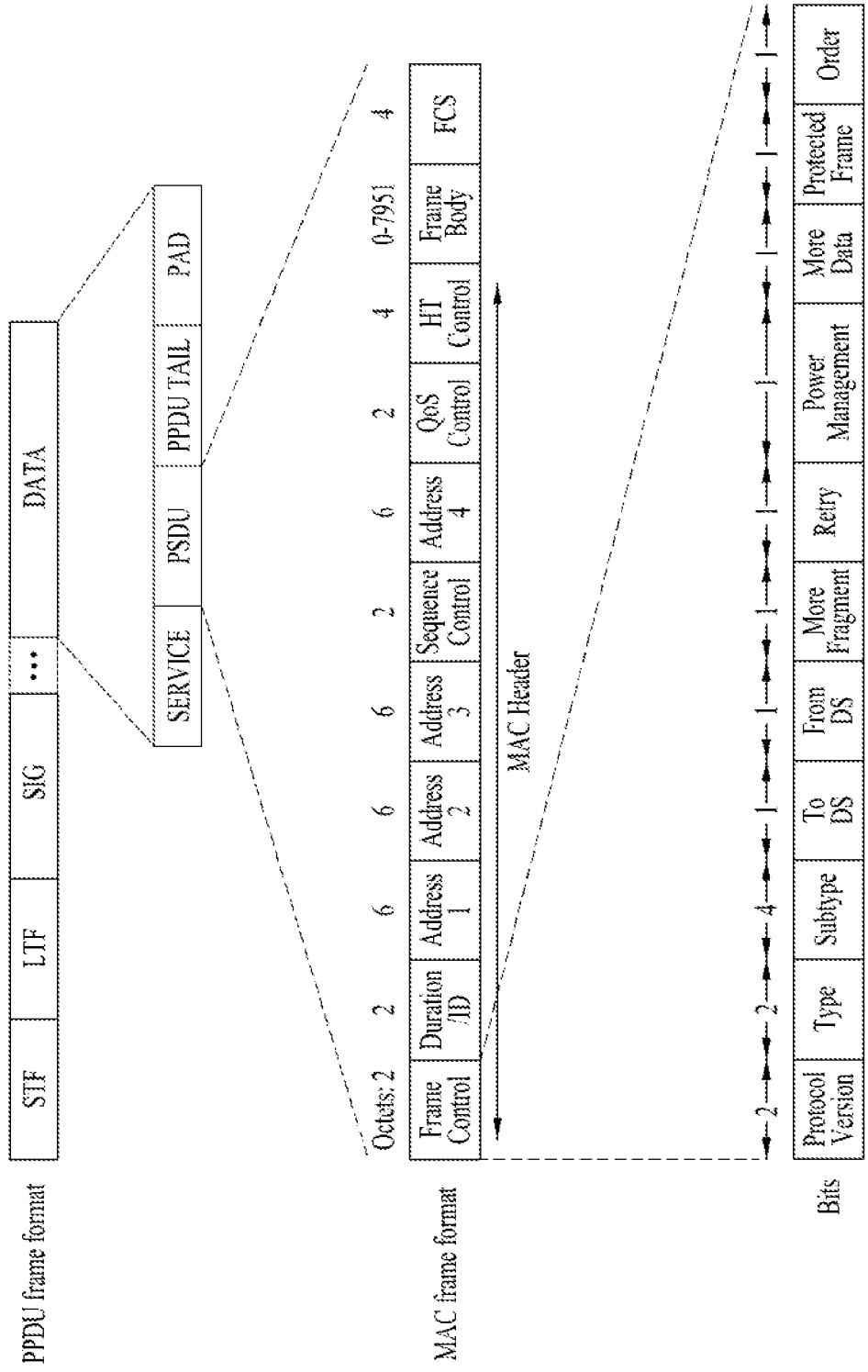
FIG. 10 illustrates an example of a frame structure used in an IEEE 802.11 system.

FIG. 10 illustrates an example of a frame structure used in IEEE 802.11.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention-free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (μs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

Figure 11:
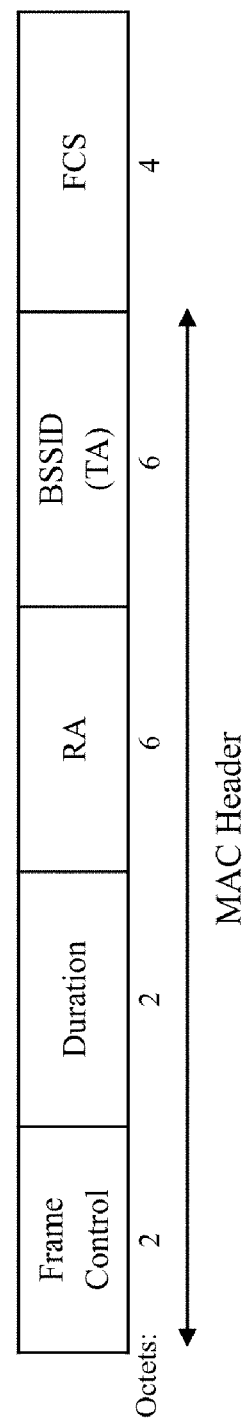
FIG. 11 illustrates a contention-free-END frame.
Figure 12:
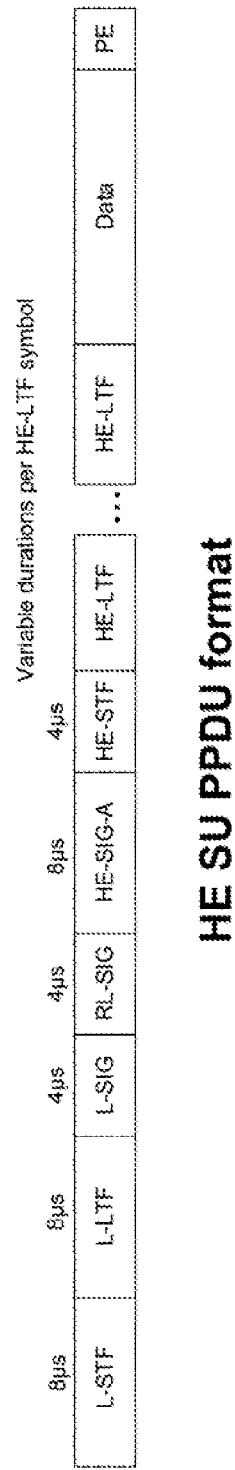
FIG. 12 to FIG. 15 illustrate HE PPDUs.
Figure 13:
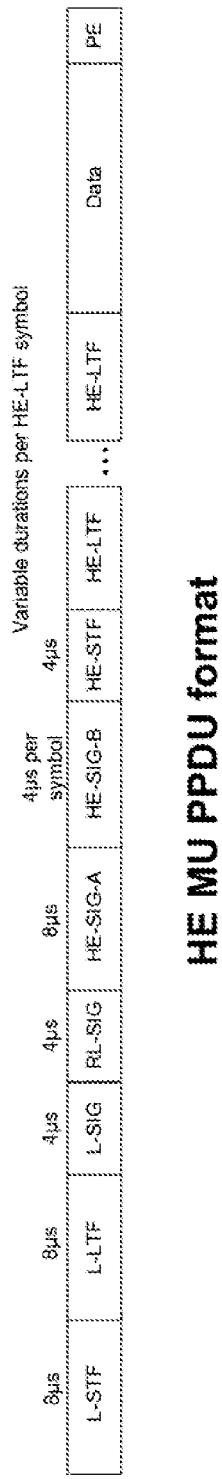
Figure 14:
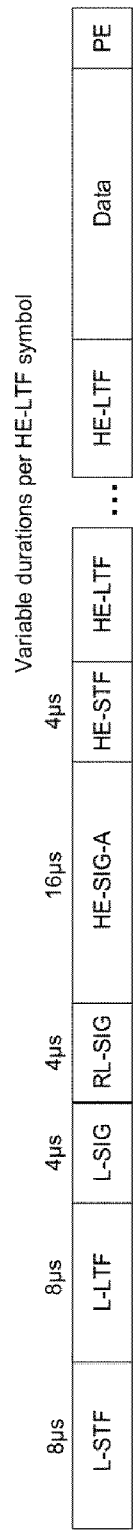
Figure 15:
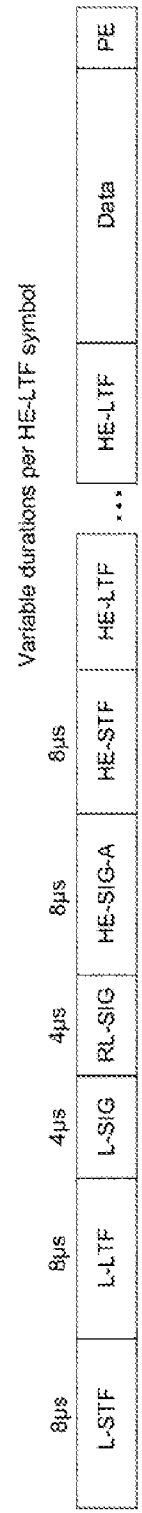

FIG. 11 illustrates a contention-free (CF) end frame.

For convenience of explanation, it is assumed that a CF end frame is transmitted by a non-directional multi-gigabit (DMG, 11ad) STA. The CF end frame may be transmitted to truncate TXOP duration. Therefore, a Duration field is set to 0 in the CF end frame. A Receiver Address (RA) field may be set to a broadcast group address. A BSSID field may be set to an address of a STA included in an AP. However, in a CF end frame in a non-HT or non-HT duplicate format transmitted by a VHT STA to a VHT AP, an Individual/Group bit of a BSSID field may be set to 1.

Example of HE PPDU Structure

Hereinafter, examples of a high-efficiency physical layer protocol data unit (HE PPDU) format in a WLAN system supporting 11ax will be described.

FIG. 12 to FIG. 15 illustrate HE PPDUs.

An HE-SIG-A field is positioned after an L-part (e.g., L-STF, L-LTF, L-SIG) and is duplicated every 20 MHz like the L-part. HE-SIG-A may be included in any HE PPDU, whereas HE-SIG-B may be omitted from a SU PPDU and a UL trigger-based PPDU (e.g., a UL PPDU transmitted based on a trigger frame).

HE-SIG-A includes common control information (e.g., a BW, a GI length, a BSS color, a CRC, a tail, and the like) for STAs. The HE-SIG-A field includes information for interpreting an HE PPDU, and thus the information included in the HE-SIG-A field may change depending on the format of the HE PPDU (e.g., a SU PPDU, a MU PPDU, a trigger-based PPDU, or the like).

For example, (i) in an HE SU PPDU format, an HE-SIG-A field may include at least one of a DL/UL indicator, an HE PPDU format indicator, a BSS color, TXOP duration, a bandwidth (BW), a MCS, a CP+LTF length, coding information, the number of streams, STBC (e.g., whether STBC is used), transmission beamforming (TxBF) information, a CRC and a tail. In the HE SU PPDU format, an HE-SIG-B field may be omitted. (ii) In an HE MU PPDU format, an HE-SIG-A field may include at least one of a DL/UL indicator, a BSS color, TXOP duration, a BW, MCS information of a SIG-B field, the number of symbols of the SIG-B field, and the number of HE LTF symbols, an indicator indicating Full-band MU-MIMO usage indicator, a CP+LTF length, transmission beamforming (TxBF) information, a CRC, and a tail. (iii) In an HE trigger-based PPDU format, an HE-SIG-A field may include at least one of a format indicator (e.g., whether a PPDU is a SU PPDU or a trigger-based PPDU), a BSS color, TXOP duration, a BW, a CRC, and a tail.

HE-SIG-A may include at least one of user allocation information, for example, an STA identifier, such as a PAID or a GID, information about an allocated resource, and the number of streams (Nsts) in addition to the foregoing common information.

BSS color information included in the HE-SIG-A field is information for identifying a BSS and has a shorter length than a BSSID. For example, while the BSSID has a length of 48 bits, the BSS color information may have a length of 6 bits. A STA may determine whether a frame is an intra-BSS frame using the BSS color information. That is, by decoding only the HE-SIG-A field without needing to decode the entire HE PPDU, the STA can distinguish an intra-BSS PPDU from an inter-BSS PPDU through the BSS color information.

HE-SIG-B may be independently encoded every 20-MHz channel. HE-SIG-B encoded every 20-MHz channel may be referred to as an HE-SIG-B content channel.

According to an embodiment, when a bandwidth is not greater than 20 MHz, one HE-SIG-B content channel may be transmitted. When a bandwidth is greater than 20 MHz, each of 20-MHz channels may transmit either a first HE-SIG-B content channel (hereinafter, HE-SIG-B [1]) or a second HE-SIG-B content channel (hereinafter, HE-SIG-B [2]). For example, HE-SIG-B [1] and HE-SIG-B [2] may be alternately transmitted. Odd-numbered 20-MHz channels may transmit HE-SIG-B [1], and even-numbered 20-MHz channels may transmit HE-SIG-B [2]. Specifically, in a 40-MHz bandwidth, HE-SIG-B [1] is transmitted on a first 20-MHz channel, and HE-SIG-B [2] is transmitted on a second 20-MHz channel. In an 80-MHz bandwidth, HE-SIG-B [1] is transmitted on a first 20-MHz channel, HE-SIG-B [2] is transmitted on a second 20-MHz channel, the same HE-SIG-B [1] is repeatedly transmitted on a third channel, and the same HE-SIG-B [2] is repeatedly transmitted on a fourth 20-MHz channel. In a 160-MHz bandwidth, transmission is performed in a similar manner.

HE-SIG-B [1] and HE-SIG-B [2] may have different contents, respectively. However, all pieces of HE-SIG-B [1] have the same content. Likewise, all pieces of HE-SIG-B [2] have the same content.

HE-SIG-B may include a common field and a user-specific field. The common field may precede the user-specific field. The common field and the user-specific field may be divided in bits rather than in OFDM symbols.

The common field of HE-SIG-B includes information about all STAs designated to receive a PPDU in the bandwidth. The common field may include resource unit (RU) allocation information. For example, when four 20-MHz channels forming 80 MHz are divided into [LL, LR, RL, RR], a common block for LL and RL may be included in a common field of HE-SIG-B [1], and a common block for LR and RR may be included in a common field of HE-SIG-B [2].

The user-specific field of HE-SIG-B may include a plurality of user fields, and each user field may include information specific to an individual STA designated to receive a PPDU. For example, the user field may include at least one of a STA ID, a MCS for each STA, the number of streams (Nsts), coding (e.g., an indication as to use of LDPC), a DCM indicator, and transmission beamforming information but is not limited thereto.

Trigger Frame

Figure 16:
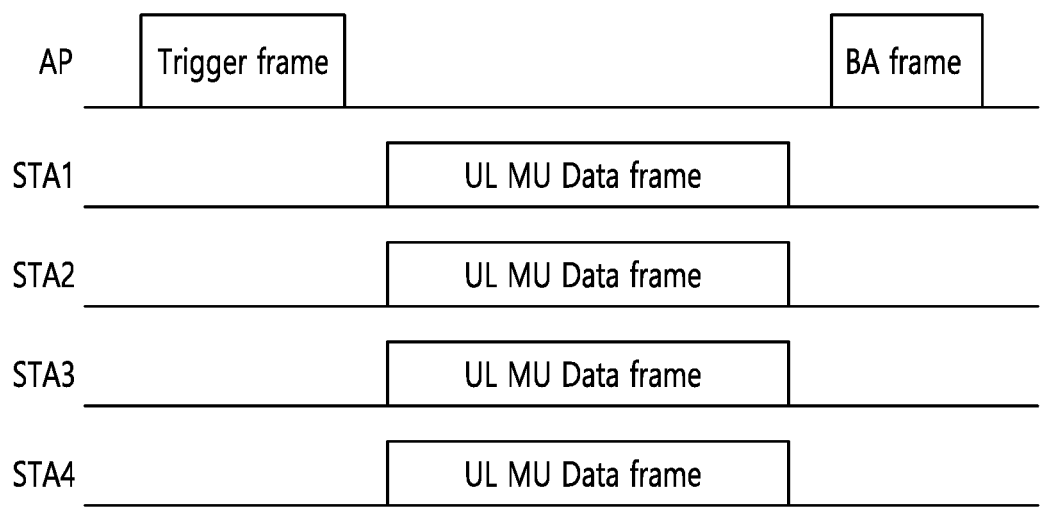
FIG. 16 is a diagram for describing an uplink multi-user transmission situation based on a trigger frame.

FIG. 16 is a diagram for describing an uplink multi-user transmission situation based on a trigger frame.

As described above, a UL MU transmission method can be used in 802.11ax and UL MU transmission can be started upon transmission of a trigger frame from an AP to a plurality of STAs (for example, STA' to STA 4), as illustrated in FIG. 16. The AP can acquire a TXOP to be used for trigger frame transmission through a contention process for accessing a medium.

The trigger frame may include UL MU allocation information. The UL MU allocation information may include, for example, at least one of resource positions and sizes, STA IDs or STA addresses, and MCS and MU types (MIMO, OFDMA, etc.). Specific trigger frame content will be described later.

STAs can transmit UL data frames in an HE trigger based PPDU format after an SIFS from a PPDU including the trigger frame.

The AP can perform acknowledgement for the UL MU data frames through a block ACK (BA) frame.

FIG. 17 illustrates a trigger frame format according to an embodiment. Specifically, (a) of FIG. 17 illustrates the entire trigger frame, (b) illustrates a common information field of the trigger frame, and (c) illustrates a user information field of the trigger frame.

Referring to (a) of FIG. 17, the trigger frame may include at least one of a frame control field, a duration field, a recipient STA address (RA) field, a transmitting STA address (TA) field, a common information field, one or more individual user information (Per User Info) fields, padding and a frame check sequence (FCS). The RA field indicates an address or an ID of a recipient STA and may be omitted according to an embodiment. The TA field indicates an address of a transmitting STA.

Referring to (b) of FIG. 17, the common information field may include at least one of trigger type, length, cascade indication, carrier sensing (CS) required, bandwidth (BW), guide interval (GI) & long training field (LTF) mode, MU-MIMO LTF mode, the number of HE-LTF symbols, STBC, LDPC extra symbol segment, AP TX power, packet extension, spatial reuse, Doppler, HE-SIG A information, reserved, and trigger-dependent common information subfields. The trigger type subfield indicates the type of the trigger frame. The trigger type can be set to, for example, any one of a basic trigger type (e.g., type 0), a beamforming report poll trigger type (e.g., type 1), a multi-user block Ack request (MU-BAR) type (e.g., type 2), a multi-user ready to send (MU-RTS) type (e.g., type 3), buffer status report poll (e.g., type 4), GCR MU BAR (e.g., type 5) and BW query report poll (e.g., type 6), and NDP feedback report poll (e.g., type 7) but is not limited thereto. The length subfield indicates the L-SIG length of an HE trigger based PPDU (e.g., UL MU PPDU). The cascade indication indicates whether there is transmission of a trigger frame subsequent to the current trigger frame. The CS required subfield indicates whether the corresponding STA needs to determine whether to perform response in consideration of a medium sensing result and NAV. The BW subfield indicates a bandwidth to HE SIG A of the HE trigger based PPDU.

Referring to (c) of FIG. 17, the user information field may include at least one of an AID 12 subfield, a resource unit (RU) allocation subfield, a coding type subfield, an MCS field, a dual sub-carrier modulation (DCM) subfield, a spatial stream (SS) allocation subfield, a target RSSI subfield, reserved, and a trigger dependent Per User Info subfield. The AID 12 subfield indicates 12 LSBs of the AID of an STA which will receive the user information field. AID 12 subfield=0 or 2045 indicates that the user information field is RU allocation for random access. AID 12 subfield=4095 indicates that a padding field starts in the trigger frame.

The padding field can be optionally provided in the trigger frame. The padding field extends the length of the trigger frame to provide a time for which a recipient STA prepares SIFS response after reception of the trigger frame. When the padding field is provided, the padding field has a length of at least 2 octets and is set to 1.

FIG. 18 illustrates the user information field of the trigger frame according to an embodiment of the present disclosure.

As described above, the AID 12 field of the user information field of the trigger frame illustrated in FIG. 17 indicates 12 LSBs of an STA which will use resources allocated through the trigger frame.

Since the conventional AID range is 1 to 2007, values of 1 to 2007 can be sufficiently indicated by an 11-bit AID field. Accordingly, in the example of FIG. 18, the AID 12 field can be reduced to an AID 11 field and the remaining 1 bit can be used for other purposes in the user information field of the trigger frame. For example, B0 to B10 indicate AID 11 and the remaining bit B11 corresponds to a reserved bit.

For example, in a case where the user information field indicates trigger frame padding as a case in which AID is reduced to an AID 11 field, 11 bits (B0 to B10) corresponding to the AID 11 field of the user information field can be set to 2047. If AID 12 field=4095 indicates start of padding in the AID 12 field mode, AID 11 field=2047 can indicate start of padding in the AID 11 field mode.

Examples of setting the reserved field corresponding to the remaining 1 bit (B11) are as follows.

Example 1: The reserved field can be set to 1 by default irrespective of the value of AID 11. If the reserved field B11 is used for other purposes, the reserved field can be exceptionally set to 0 in order to indicate this.

Example 2: The reserved field can be set to 1 only when AID 11 is set to all 1s (i.e., 2047). For example, when AID 11 is set to a value other than 2047, the reserved field is set to 0.

Example 3: When AID 11 ([B0:B10]) is set to all is (i.e., 2047) irrespective of the value of B11, trigger frame padding may be indicated.

PHY Transmission/Reception Procedures

General PHY transmission/reception procedures in a WLAN are described.

According to a PHY transmission procedure, a PHY layer converts a MAC protocol data unit (MPDU) or an aggregated MPDU (A-MPDU) received from a MAC layer into one PHY service data unit (PSDU), generates a PPDU by inserting a preamble, tail bits, and padding bits (if necessary) into the PSDU, and transmits the PPDU.

According to a PHY reception procedure, a STA/AP performs energy detection and preamble detection (e.g., L/HT/VHT/HE-preamble detection per Wi-Fi version) and obtains information about a PSDU configuration from a PHY header (e.g., L/HT/VHT/HE-SIG). Subsequently, the STA/AP reads a MAC header and data based on the information about the PSDU configuration.

Details of the PHY transmission/reception procedures according to 11n/ac/ac are defined in the IEEE 802.11a/ac/ax standards.

ACK/BA Transmission and ACK Policy

In general, a BA frame is used as a response to an A-MPDU, and an ACK frame is used as a response to an MPDU.

Figure 19:
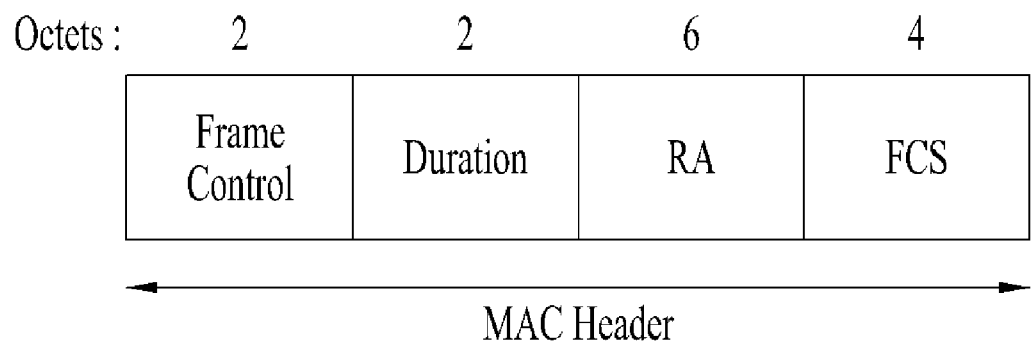
FIG. 19 illustrates an ACK frame.

FIG. 19 illustrates an ACK frame.

An RA field of the ACK frame is configured identically to an Address 2 field of a preceding frame (e.g., individually addressed data, management, BlockAckReq, BlockACK, PS-poll, and the like). When the ACK frame is transmitted by a non-QoS STA and a More Fragments bit of a Frame Control field of the preceding frame is 0, the duration of the ACK frame is set to 0. When the ACK frame is transmitted by the non-QoS STA, and the More Fragments bit of the Frame Control field of the preceding frame is not 0, the duration of the ACK frame is set to the value of a Duration/ID field of the preceding frame minus ACK transmission time+SIFS.

Table 1 shows the configuration of a BAR (BlockAck-Req) frame.

TABLE 1

| MAC header of control frame | | | | |
|---|---|---|---|---|
| BAR control | 2-octet | BAR Ack policy | 1-bit | Immediate Ack/no ack |
| | | Multi-TID | 1-bit | 0x00: Basic Block AckReq |
| | | Compressed bitmap | 1-bit | 0x01: Compressed BlockAckReq |
| | | | | 0x10: Reserved |
| | | | | 0x11: Multi-TID BlockAckReq |
| | | Reserved | 9-bit | |
| | | TID_INFO | 4-bit | In Basic & Compressed, TID In Multi-TID, # of TID |
| BAR information (In Basic & Compressed Block Ack) | Variable | Block Ack Starting Sequence Control | 2-octet | Fragment number (4 bits): 0x00 Start Seq Number (12 bits): of the 1st A-MSDU |
| BAR information (In Multi-TID Block Ack) | Variable | Per TID Info | 2-octet * n | Reserved: 12 bits TID value: 4 bits |
| | | Block Ack Starting Sequence Control | 2-octet * n | Fragment number (4 bits): 0x00 Start Seq Number (12 bits): of the 1st A-MSDU |
| FCS | 4-octet | | | |

Table 2 shows the configuration of a block ACK (BA) frame.

TABLE 2

| MAC header of control frame | | |
|---|---|---|
| BA control | 2-octet | Same with BAR control |
| BA information | Variable | Same with BAR information except adding Block Ack Bitmap(128/8/8*n) indicating the received status of up to 64 A-MSDUs |
| FCS | 4-octet | |

Table 3 shows the configuration of a BA/BAR ACP Policy subfield.

TABLE 3

| Value | Meaning |
|---|---|
| 0 | Normal Acknowledgment. The BA/BAR Ack Policy subfield is set to this value when the sender requires immediate acknowledgment. The addressee returns an Ack frame. The value 0 is not used for data sent under HT-delayed Block Ack/Block Ack Req during a PSMP sequence. The value 0 is not used in frames transmitted by a DMG STA. |
| 1 | No Acknowledgment. The addressee sends no immediate response upon receipt of the frame. The BA/BAR Ack Policy subfield is set to this value when the sender does not require immediate acknowledgment. The value 1 is not used in a Basic BlockAck/BlockAckReq frame outside of PSMP sequence. The value 1 is not used in a Multi-TID BlockAck/Block/AckReq frame. |

A QoS Control field is provided in any data frame with QoS subfield=1. Table 4 shows the configuration of the QoS Control field.

TABLE 4

| Bits in QoS Control field | | |
|---|---|---|
| Bit 5 | Bit 6 | Meaning |
| 0 | 0 | Normal Ack or Implicit BAR In a frame that is non-A-MDPU frame or VHT single MDPU: The addressed recipient returns an Ack or QoS -CF-Ack frame after a short interframe space (SIFS) period. A non-DMG STA sets the Ack Policy subfield for individually addressed QoS Null (no data) frames to this value. Otherwise: The addressed recipient returns a BlockAck frame, either individually or as part of an A-MPDU starting a SIFS after the PPDU carying the frame. |
| 1 | 0 | No Ack The addressed recipient takes no action upon receipt of the frame. The Ack Policy subfield is set to this value in all individually addressed frames in which the sender does not require acknowledgment. The Ack Policy subfield is also set to this value in all group addressed frames that use the QoS frame format except with a TID for which a block ack agreement exists. This value of the Ack Policy subfield is not used for QoS Data frames with a TID for which a block ack agreement exists. The Ack Policy subfield for group addressed QoS Null (no data) frames is set to this value. |

TABLE 4-continued

| Bits in QoS Control field | | |
|---|---|---|
| Bit 5 | Bit 6 | Meaning |
| 0 | 1 | No explicit acknowledge of PSMP Ack When bit 6 of the Frame Control field is set to 1 (i.e. No data): There may be a response frame to the frame that is received, but it is neither the Ack frame nor any Data frame of subtype -CF-Ack. The Ack Policy subfield for QoS CF-Poll and QoS CF-Ack -CF-Poll Data frames is set to this value. When bit 6 of the Frame Control field is set to 0: The acknowledgment for a frame indicating PSMP Ack when it appears in a PSMP downlink transmission time (PSMP-DTT) is to be received in a later PSMP uplink transmission time (PSMP-UTT). The acknowledgment for a frame indicating PSMP Ack when it appears in a PSMPUTT is to be received in a later PSMP-DTT. NOTE-Bit 6 of the Frame Control field indicates the absence of a data payload. When equal to 1, the QoS Data frame contains no payload, and any response is generated in response to a QoS CF-Poll or QoS CF-Ack -CF-Poll frame, but does not signify an acknowledgment of data. When set to 0, the QoS Data frame contains a payload. |
| 1 | 1 | BA The addressed recipient takes no action upon the receipt of the frame except for recording the state. The recipient can expect a BlockAckReq frame in the future |

Hybrid Automatic Repeat Request (HARD) Operation for WLAN

Although an HARQ process has not yet been introduced in a current WLAN system, the present disclosure proposes introducing the HARQ process in the WLAN system.

When the HARQ process is introduced, airtime occupied to finally transmit a frame may be reduced.

Hereinafter, airtime occupancy levels in ARQ transmission and HARQ transmission based on a current MPDU structure are simply compared.

The following basic conditions are assumed:
In A-MPDU transmission with an 80-MHz bandwidth, each MPDU is assumed to be 1500 bytes. TXOP is assumed to be up to approximately 5 ms. Since an HARQ retransmission unit is not yet defined, it is assumed that an MPDU unit is an HARQ retransmission unit for comparison between an ARQ and an HARQ.
A MCS corresponding to a packet error rate (PER) of approximately 10% is selected in the ARQ, and a MCS corresponding to a PER of approximately 30-50% is selected in consideration of retransmission in the HARQ. A MCS is selected based on a PER graph based on channel estimation including fading.

A block ACK (BA) for the ARQ is assumed to have a length of 64 us, and a physical ACK/NACK (PA) for the HARQ is assumed to have a length of 24 us. Since the PA is an undefined frame, it is assumed that the PA frame uses 20-us L-preamble+one 4-us symbol.

Comparison Analysis:

The time until transmission of corresponding MPDUs is complete including retransmission time after the A-MPDU transmission is analyzed. In this case, in the HARQ, it is assumed that a BAR and BA transmission is final transmission completion in order to complete a MAC-layer procedure.

In Table 5, MCS0&1 means that transmission is performed via MCS0 in the ARQ and transmission is performed via MCS1 in the HARQ.

Figure 20:
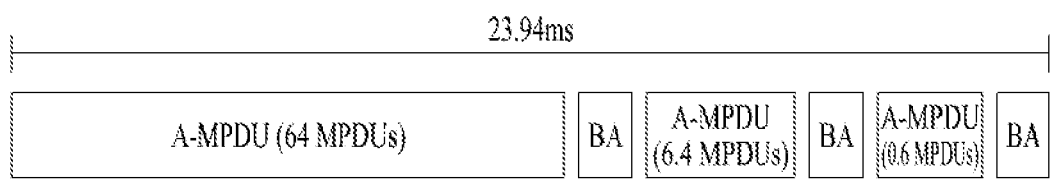
FIG. 20 is a diagram for describing a case in which a 64-MPDU is transmitted using ARQ.

For example, FIG. 20 illustrates a case of transmitting 64 MPDUs using an ARQ. Referring to FIG. 20, it is assumed that a PER is 10% when MCS0 is used and 10% of the MPDUs, that is, an average of 6.4 MPDUs, are retransmitted in subsequent retransmission. Then, 0.6 MPDUs are retransmitted, after which transmission of the MPDUs is finally complete.

Figure 21:
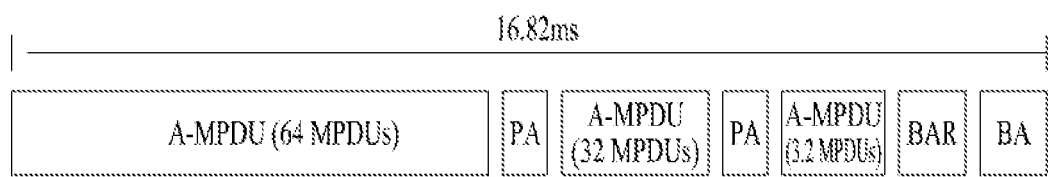
FIG. 21 is a diagram for describing a case in which a 64-MPDU is transmitted using HARQ.

FIG. 21 illustrates a case of transmitting 64 MPDUs using an HARQ.

For the same SNR in an ARQ, MCS1 is used in an HARQ, in which a PER is assumed to be 50%. Therefore, 32 MPDUs are retransmitted in initial retransmission, and then 10% or 3.2 MPDUs are retransmitted by obtaining an HARQ combining gain, after which transmission of the MPDUs is finally complete.

In FIG. 20 and FIG. 21, it is assumed that the distance between frames is SIFS and that final transmission is complete within one TXOP for comparison between airtime occupancy times.

Therefore, as shown in Table 5, airtime may exceed 5 ms TXOP in a low MCS, and when the number of MPDUs is adjusted so that airtime does not exceed about 5 ms, the number of initially transmitted MPDUs is 15/30/45/64/64/64.

As a result, in a low MCS, airtime in the HARQ is less than that in the ARQ. Therefore, in a low MCS, applying the HARQ contributes to improvement in overall system performance.

TABLE 5

| | MCS0&1 | | MCS1&2 | | MCS2&3 | | MCS 3&4 | MCS 4&5 | MCS 5&6 |
|---|---|---|---|---|---|---|---|---|---|
| | 64 MPDUs | 15 MPDUs | 64 MPDUs | 30 MPDUs | 64 MPDUs | 45 MPDUs | 64 MPDUs | 64 MPDUs | 64 MPDUs |
| ARQ | 23.94 ms | 5.84 ms | 12.09 ms | 5.81 ms | 8.15 ms | 5.82 ms | 6.19 ms | 4.22 ms | 3.23 ms |
| HARQ | 16.82 ms | 4 ms | 11.32 ms | 5.47 ms | 8.58 ms | 6.13 ms | 5.83 ms | 4.44 ms | 3.36 ms |

In the current WLAN system, channel coding (e.g., a convolutional code or LDPC) is applied in PSDUs. Further, a CRC for error detection is included in a delimiter or a PHY header of an A-MPDU (e.g., SIG). The channel coding and the CRC in the current WLAN are insufficient for an HARQ, because the CRC in the delimiter of the A-MPDU can be checked after a STA/AP performs decoding up to a MAC layer, and the channel coding in PSDUs may have a too large unit to be applied to the HARQ. For reference, one PSDU corresponds to up to 2304 to $2^{22}-1$ octets depending on Wi-Fi versions according to 11g/n/ac/ax.

In order to solve the foregoing problems, a basic unit of HARQ transmission is newly defined in an embodiment of the present disclosure. Although the newly defined basic unit of HARQ transmission is referred to as a physical HARQ data unit (PHDU) for convenience, the present disclosure is not limited by a term, and the term may be changed. In another example, an existing data unit (e.g., a PSDU or the like) may be redefined as a PHDU.

FIG. 22 illustrates PHDUs according to embodiments of the present disclosure.

Although only one PHDU may exist as shown in (a) of FIG. 22, a plurality of PHDUs may be aggregated as shown in (b)/(c) of FIG. 22, in which the aggregated PHDUs are referred to as an A-PHDU.

FIG. 22 shows training symbols and a PHY header as one block in front of a PHDU or A-PHDU, but the positions or number of training symbols/PHY headers may vary. In addition, when zero-tailed convolutional coding (e.g., convolutional coding currently supported by Wi-Fi) is used, tail bits may be added, and pad bits may be added if padding is needed.

The A-PHDU may include A-PHDU subframes. Each subframe may include a PHDU or PHDU+CRC (+tail bits+pad bits).

In an A-PHDU according to (b) of FIG. 22, a data part forming a PHDU may be the entirety or part of an existing PSDU. When the existing PSDU is entirely included in the data part, one PHDU includes one PSDU, and thus the A-PHDU may include one PHDU similarly to that in (a) of FIG. 22. Alternatively, the A-PHDU may include a plurality of PSDUs. When part of the existing PSDU is included in the data part, one existing PSDU may be divided into segments (referred to as segmented PSDUs), which may be included in respective PHDUs.

Referring to (c) of FIG. 22, a PHDU may correspond to the same unit as a PSDU or may correspond to a segmented PSDU.

Hereinafter, for convenience, an A-PHDU subframe is referred to as a PHDU. The configuration of a PHDU may be changed according to (a) to (c) of FIG. 22.

According to an embodiment of the present disclosure, unlike in a conventional art, for an HARQ, channel coding may be applied per PHDU, and a CRC may be inserted. Therefore, HARQ transmission and retransmission may be performed per PHDU.

FIG. 23 illustrates an HARQ transmission and retransmission procedure performed per PHDU. For convenience, components other than a PHDU, an ACK (A), and a NACK (N) are not shown. Further, a format for A/N transmission is not shown, but it is assumed that an A/N is transmitted in the order of PHDUs.

When a transmitter transmits PHDU 1, PHDU 2, and PHDU 3, a receiver checks the CRCs of the received PHDUs. When the result of checking the CRCs of PHDU 2 and PHDU 3 corresponds to failure, the receiver transmits an A of PHDU 1 and an N of PHDU 2 and PHDU 3. When the transmitter properly receives A/N information, the transmitter retransmits PHDU 2 and PHDU 3.

Here, the format of a retransmitted PHDU may vary according to an HARQ scheme. For example, when chase combining (CC) is used, the transmitter may retransmit PHDU 2 and PHDU 3 as they are, and when incremental redundancy (IR) is used, the transmitter may retransmit PHDU 2' and PHDU 3' having parity bits different from PHDU 2 and PHDU 3 in the initial transmission. In FIG. 23, for convenience, a retransmitted PHDU is indicated by a PHDU'.

The receiver may receive the retransmitted PHDUs, may combine and decode the PHDUs and the previously received PHDUs, and may check the CRCs of the PHDUs. When the result of checking the CRC of PHDU 3 corresponds to failure, the receiver transmits an N, receives retransmitted PHDU 3', and then performs an HARQ operation again.

A/N transmission may be performed after SIFS from transmission of PHDUs. Retransmission may be performed after SIFS from A/N transmission, or retransmission may be performed after newly defined airtime. Alternatively, A/N transmission and retransmission may be performed at an interval of SIFS only within a TXOP period, and when the TXOP expires, the HARQ may be continuously performed based on new airtime.

Figure 24:
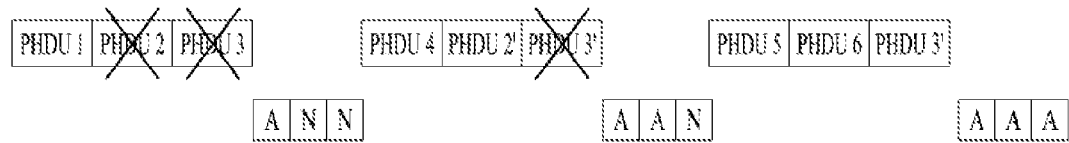
FIG. 24 is a diagram for describing a HARQ transmission and retransmission procedure performed in units of PHDU according to another embodiment of the present disclosure.

Although FIG. 23 shows an HARQ process for PHDU 1, PHDU 2, and PHDU 3, an HARQ process illustrated in FIG. 24 may be performed, for example, when there are more PHDUs to be transmitted. For example, a transmitter may transmit a new PHDU along with a retransmitted PHDU instead of a successfully transmitted PHDU.

In FIG. 24, the position of a retransmitted PHDU is maintained the same as that in initial transmission, and a new PHDU is disposed at the position of a successfully transmitted PHDU. In this case, a receiver knows the order of retransmitted PHDUs and can thus wait for the retransmitted PHDUs in that order. For example, PHDU2' may be transmitted at the same position as that of PHDU 2 which has failed to be transmitted.

In another example, for convenience of the transmitter, regardless of the positions of PHDUs in previous transmission, retransmitted PHDUs may be disposed in front and new PHDUs may be disposed in back.

A/N transmission described above means an ACK/NACK in a PHY layer in response to reception of each PHDU. Therefore, a final ACK/NACK of a (A-)MPDU in a MAC layer may be transmitted as an ACK frame or a BA frame. For example, final A/N transmission in the MAC layer may be performed in addition to A/N transmission according to the HARQ process.

When the HARQ process is introduced and an existing ACK policy is applied, an ACK policy on the ACK/BA frame may be configured such that the receiver transmits the Ack/BA frame after receiving a block ACK request (BAR) frame.

Alternatively, according to a method for reducing overhead in A/N transmission, when last ACK transmission of the HARQ process corresponds to successful transmission of the last (A-)MPDU, both last ACK transmission and BAR reception in the PHY layer are omitted, and an ACK/BA frame may be transmitted immediately after SIFS. However, in this case, even though ACK information of the PHY layer, which can be shared between the PHY layer and the MAC layer, is omitted, an interaction between PHY/MAC for detecting the ACK information of the PHY layer from ACK information of the MAC layer may be defined.

Although the A-PHDU/PHDUs are simply illustrated in the above examples, an A-PHDU may be transmitted along with another A-PHDU within a band in a multi-user (MU) manner.

FIG. 25 illustrates an MU A-PHDU according to an embodiment of the present disclosure.

(a) of FIG. 25 shows a case where two A-PHDUs are multiplexed and transmitted in the MU manner in a frequency domain, and (b) of FIG. 25 shows a case where two A-PHDUs are multiplexed and transmitted in the MU manner in a spatial domain. (a) of FIG. 25 and (b) of FIG. 25 may be combined.

A PHY header may be divided into a header (e.g., 2205 and 2215) indicating information about an MU allocation and a configuration in the entire bandwidth and a header (e.g., 2210 and 2220) indicating information about an allocation and a configuration within each A-PHDU. However, the illustrated position and configuration of the PHY header are for illustration and may be variously changed.

Figure 26:
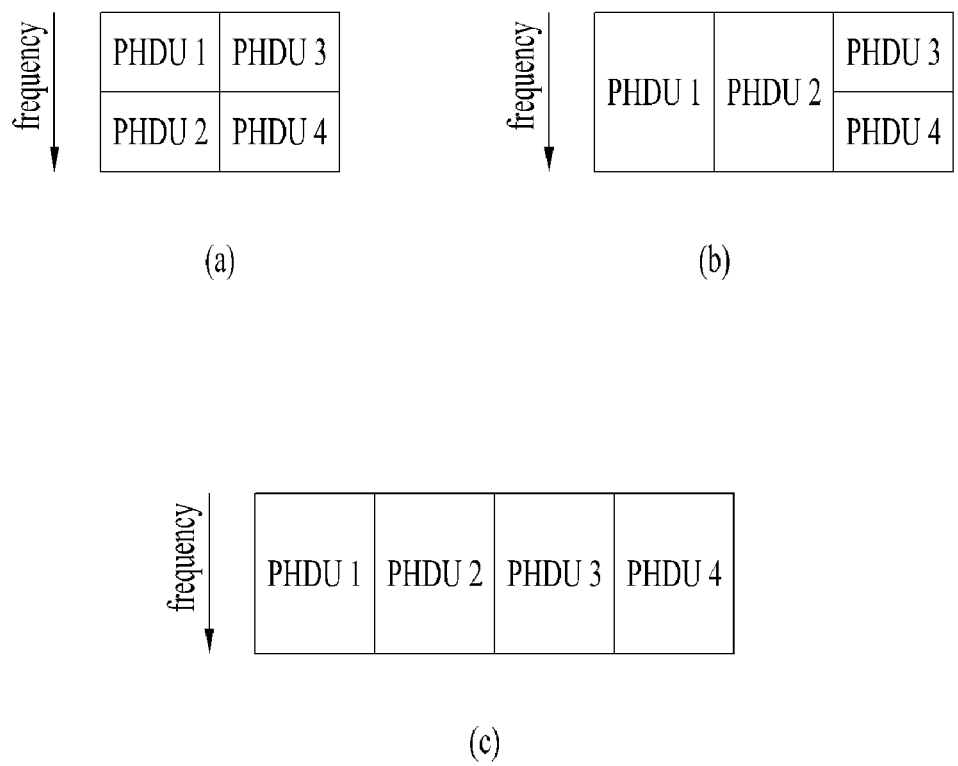
FIG. 26 illustrates examples of PHDU configurations in an A-PHDU according to an embodiment of the present disclosure.

FIG. 26 illustrates examples of the configuration of a PHDU in an A-PHDU according to an embodiment of the present disclosure. As shown in FIG. 26, PHDUs in the A-PHDU may be multiplexed in time/frequency and/or spatial domains. The PHDUs in the A-PHDU may correspond to an MU or an SU.

Proposal 1. HARQ Process Configuration when 1 STA/AP Receives A-PHDU from at Least One Transmitting STA A case in which one or more STAs transmit A-PHDUs to one STA/AP is referred to as uplink (UL) for convenience. Hereinafter, methods necessary for configuration and transmission/reception of a UL A-PHDU are proposed.

Proposal 1-1. UL SU/MU HARQ Procedure

A UL SU HARQ procedure may mean a case in which one STA transmits an A-PHDU and a UL MU HARQ procedure may mean a case in which one or more STAs transmit PHDUs constituting an A-PHDU.

(1) UL SU HARQ Procedure

The UL SU HARQ procedure can be performed similarly to a DL SU procedure. An STA occupies airtime when it needs to perform transmission and then transmits an A-PHDU. An STA/AP can transmit ACK/NACK for the received A-PHDU after SIFS. The transmitting STA can perform retransmission of the PHDU for the received NACK after SIFS or after re-occupying airtime. Meanwhile, a PHY header in the A-PHDU may include information about the A-PHDU configuration.

(2) UL MU HARQ Procedure

When one or more STAs intend to transmit PHDUs in one A-PHDU, advance instruction of a recipient STA/AP is required. For example, as an AP transmits a trigger frame as an advance instruction and then receives UL MU frames from STAs for UL MU of 11ax, advance instruction may also be necessary for the UL MU HARQ procedure. For convenience, a frame for advance instruction is referred to as a HARQ trigger frame. The HARQ trigger frame may be defined as a new frame or defined as a type of the existing trigger frame.

The HARQ trigger frame can indicate which STAs need to transmit PHDUs and regions in which the PHDUs will be transmitted. For example, the following information related to PHDU and HARQ may be included in the user information field of the existing trigger frame.

In this case, A-PHDU configuration information can be included in the HARQ trigger frame instead of the PHY header of the A-PHDU. Accordingly, the following information can be omitted in the PHY header of the UL MU A-PHDU. Otherwise, the UL MU A-PHDU may not include the PHY header. However, L-SIG may not be omitted unlike the PHY header that is omitted.

(i) Information such as index/size/position of each PHDU: The index of each PHDU may be a value indicating how many PHDUs are present before the corresponding PHDU in an A-PHDU. For example, when an A-PHDU is transmitted to multiple STAs, each STA can ascertain a PHDU allocated thereto through the order of the STA ID thereof and a PHDU index and decode the PHDU.

The size and position of each PHDU may be values indicating information about a time/frequency/space for decoding the PHDU.

For example, time information of the PHDU may be a start symbol index and an end symbol index of the PHDU/ the number of allocated symbols. A start symbol of an A-PHDU may correspond to symbol index 0. Time information may be indicated in μs instead of as a symbol.

For example, frequency information of the PHDU may indicate a bandwidth used for the PHDU or indicate RU information as in 11ax. For example, an RU allocation field of SIG-B of 11ax can be used as frequency information. When a basic RU unit (e.g., 26-RU) is defined, frequency information may indicate a start 26-RU index and the number of 26-RUs used for the PHDU/end 26-RU index.

For example, spatial information of the PHDU can indicate the number of spatial streams (e.g. Nsts). If MU-MIMO is applied to PHDUs of an A-PHDU, the spatial information of the PHDU can indicate a stream index/stream number used for each PHDU. The spatial information may be provided as information necessary for (iii) PHDU decoding which will be described later.

(ii) HAM) information: Information about whether a HARQ process is supported for an A-PHDU or each PHDU can be provided. If the HARQ process is supported, the following information can be additionally provided.

When a transmitting STA/AP performs a HARQ process for multiple PHDUs, HARQ information can include information (e.g., HARQ ID) indicating how many PHDUs are present before the corresponding PHDU in the PHDUs on which the HARQ process is performed. For example, since the number of HARQ processes may be limited to 4 according to a system, HARQ ID information may be necessary.

Information (e.g., Re-Tx ID) indicating whether a corresponding PHDU is initially transmitted or retransmitted and how many times retransmission has been performed in the case of retransmission may be provided for each PHDU. For example, Re-Tx ID=0 can indicate initial transmission and Re-Tx ID=1 can indicate retransmission.

When HARQ IR is supported, information about a method (e.g., a puncturing pattern or the like) used for transmission at a corresponding coding rate can be included in the HARQ information.

(iii) Information necessary to decode each PHDU: Information necessary to decode a PHDU can be provided after an STA/AP ascertains the position/size of the PHDU. The information necessary to decode the PHDU can include, for example, values included in the user information field of the existing trigger frame, such as an MCS, a GI+LTF size, coding, STBC and TxBF.

Meanwhile, in the UL MU HARQ procedure, an AP can order retransmission through a HARQ trigger frame without transmitting A/N using an additional frame.

Figure 27:
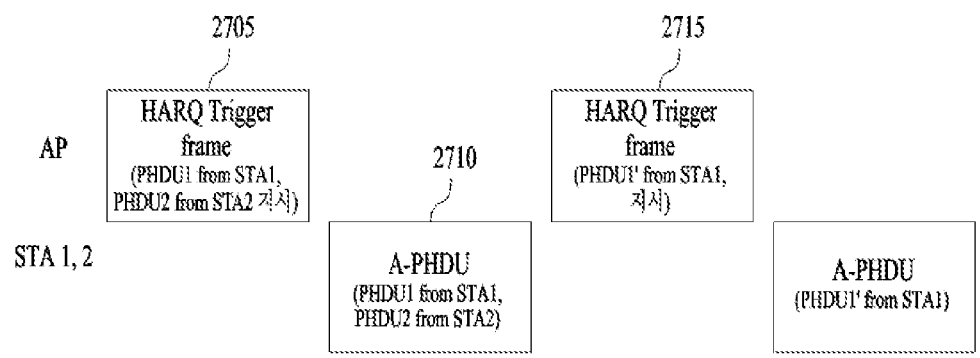
FIG. 27 is a diagram for describing a method of instructing retransmission through a HARQ trigger frame.

FIG. 27 is a diagram for describing a method of indicating retransmission using the HARQ trigger frame.

An AP indicates, to each STA, a PHDU position in an A-PHDU at which each STA needs to transmit a PHDU through a HARQ trigger frame 2705. Each STA transmits the PHDU at the position thereof according to instruction of the HARQ trigger frame 2705. Here, the PHDU transmitted by each STA may be initially transmitted or retransmitted according to instruction of the HARQ trigger frame 2705.

The AP performs CRC check upon reception of an A-PHDU 2710 from STAs. The AP can instruct STAs that has transmitted PHDU corresponding to CRC failure to retransmit the PHDUs through a HARQ trigger frame 2715 instead of signaling additional ACK/NACK according to whether CRC check is successful or fails.

Here, whether transmission of the entire A-PHDU is successful can be determined using ACK/NACK of MAC independently of ACK/NACK of HARQ. For example, the AP can transmit ACK/block ACK (BA)/MU BA frame upon successful completion of A-MPDU transmission.

Proposal 1-2. Configuration of Training Symbols

In the following examples of training symbols, mention of the PHY header may be omitted for convenience, and even when the PHY header is mentioned/illustrated, the present disclosure is not limited thereto and the position of the PHY header can be changed in various manners.

Training symbols for the UL A-PHDU can be classified as follows.

HARQ-STF: Automatic gain control (AGC) for the A-PHDU, a timing offset, and training symbols for coarse frequency offset estimation are referred to as a HARQ-STF.

HARQ-LTF: Channel estimation for the A-PHDU and training symbols for fine frequency offset estimation are referred to as a HARQ-LTF.

Conventional L-STF/LTF/SIG may be provided or may not be provided according to whether backward compatibility needs to be supported. When an L-STF/LTF/SIG is included, the L-STF/LTF/SIG may be included at the head of a signal transmitted by each STA (e.g., before a HARQ-STF of each STA) or only one L-STF/LTF/SIG may be included before the A-PHDU. If only one L-STF/LTF/SIG may be included before the A-PHDU, only the first STA can transmit the L-STF/LTF/SIG or all STAs can transmit the L-STF/LTF/SIG and start PHDU transmission thereof after waiting until PHDU transmission thereof if other STAs transmit PHDUs. Hereinafter, description of training symbols before a HARQ-STF/LTF such as an L-STF/LTF/SIG will be omitted.

Training symbols mentioned in the following embodiments relates to training symbols in the A-PHDU and the proposed training symbols can also be applied when MU-OFDM/MIMO is performed on the A-PHDU and other A-PHDUs/PPDUs (e.g., FIG. 25). For example, when MU-OFDMA is performed thereon, training symbols proposed in a band in which the A-PHDU is present can be applied unless mentioned otherwise.

Figure 28:
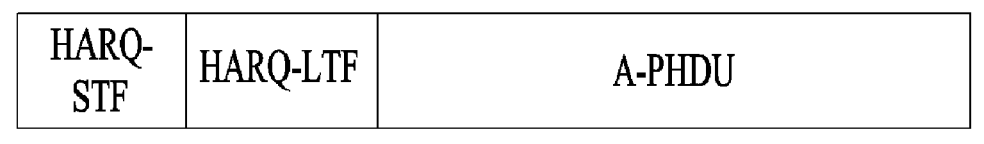

FIG. 28 illustrates a HARQ-STF/LTF of a UL A-PHDU transmitted from one STA. When the UL A-PHDU is transmitted from one STA to one AP/STA, the HARQ-STF/LTF of the UL A-PHDU can be configured as in a DL case, as illustrated in FIG. 28.

When the A-PHDU is transmitted from multiple STAs to one AP/STA, the A-PHDU can be handled as in UL-OFDMA/MIMO of 11ax. Although STAs are limited to multiplexing in the frequency/spatial domain according to UL-OFDMA/MIMO of 11ax, A-PHDU transmitted from multiple STAs is not limited to the frequency/spatial domain and STAs can also be multiplexed in the time domain.

Accordingly, a method for multiplexing A-PHDU transmission by multiple STAs in the time domain can be newly defined, which will be described.

Figure 29:
FIG. 29 illustrates a HARQ-STF/LTF configuration of a UL A-PHDU according to an embodiment of the present disclosure.

FIG. 29 illustrates a HARQ-STF/LTF configuration of a UL A-PHDU according to an embodiment of the present disclosure.

Since A-PHDU subframes can be transmitted from different STAs, STAs may have different HARQ-STF/LTF configurations. Each STA needs to transmit a HARQ-STF/LTF thereof. To this end, the HARQ-STF/LTF may be configured as illustrated in FIG. 29.

With respect to PHDUs transmitted from one STA, the HARQ-STF/LTF can be provided only to a leading PHDU in general. In this case, the HARQ-STF/LTF in blocks indicated by dotted lines in FIG. 29 can be omitted.

On the other hand, if an STA intends to apply different types of beamforming to PHDUs, the HARQ-STF/LTF may be transmitted before each of PHDUs even if the PHDUs are transmitted from one STA. In this case, the HARQ-STF/LTF in the blocks indicated by dotted lines in FIG. 29 can be transmitted.

Meanwhile, each HARQ-STF and HARQ-LTF may be configured by reusing the existing L/HT/VHT/HE-STF/LTF.

In addition, the HARQ-STF may be omitted in cases below. When each STA can perform power control and transmit the HARQ-STF using an AP Tx power field and a target RSSI field included in the existing trigger frame and an AP can ascertain the power of each STA by assuming the power using a target RSSI, the HARQ-STF can be omitted. Further, when all STAs commonly transmit one L-STF at the head of an A-PHDU, the AP may perform AGC with a value obtained by dividing total receive power by the number of STAs.

Proposal 1-3. Proposal with Respect to Timing Sync

In the case of the UL A-PHDU, when the multiple STAs transmit the UL A-PHDU, synchronization between blocks received from the multiple STAs may be a problem. For example, in the UL A-PHDU, blocks transmitted from preceding STAs and blocks transmitted from following STAs may partially overlap or may be separated in the time domain. Here, a block may be an STF/LTF/PHY header/PHDU or the like, for example.

To solve this problem, (1) a method of synchronizing STAs and an AP through signaling for synchronization prior to A-PHDU transmission and (2) a method of adding a block/symbol for synchronization in the A-PHDU are proposed.

(1) Pre-Signaling Method for Synchronization

A recipient STA/AP can instruct STAs which will transmit a UL A-PHDU to perform pre-signaling. For example, the recipient STA/AP can obtain timing information of transmitting STAs by instructing each transmitting STA to transmit a frame by which synchronization can be detected before UL MU A-PHDU transmission. The recipient STA/AP can instruct each transmitting STA to transmit a PHDU in the A-PHDU on the timing thereof by providing timing offset information to each transmitting STA based on the obtained timing information.

Figure 30:
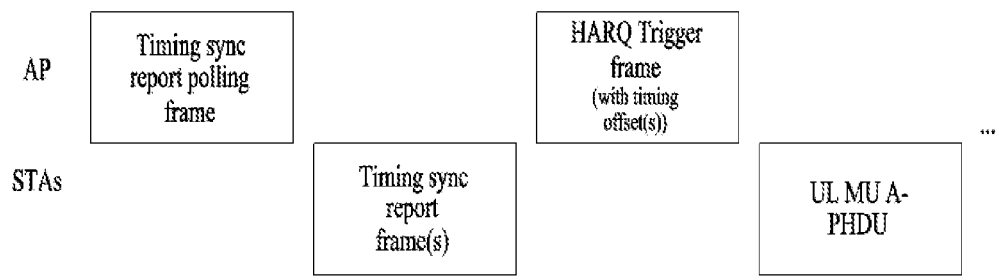
FIG. 30 is a diagram for describing a UL MU HARQ procedure including a procedure for synchronization of a UL MU A-PHDU.

FIG. 30 is a diagram for describing a UL MU HARQ procedure including a procedure for synchronization of a UL MU A-PHDU.

Referring to FIG. 30, a HARQ trigger frame can include timing offset information.

The conventional NDP feedback procedure can be reused for a timing sync report polling frame and timing sync report frame(s).

First, the conventional 11ax trigger frame is configured to include the common info field of the conventional 11ax trigger frame illustrated in FIG. 17 (the user information field is configured to sequentially include a starting AID (12 bits), reserved (9 bits), a feedback type (4 bits), reserved (7 bits), a target RSSI (7 bits) and a multiplexing flag (1 bit) in the NDP feedback report poll trigger frame when the trigger type field is set to the NDP feedback report poll (type 7) in FIG. 17(b)). The feedback type (4 bits) indicates a resource request when set to 0 and values of 1 to 15 correspond to reserved.

According to an embodiment of the present disclosure, some of the user information field in the NDP feedback report poll trigger frame may be changed as follows, for example.

"Starting AID subfield" is changed to "AID(s) subfield": An AP can include as many AIDs as the number of STAs that need to perform reporting in the AID(s) subfield. Alternatively, the number of AIDs may be fixed (e.g., 4) and thus the number of bits used for the AID(s) subfield may be fixed. Alternatively, a subfield indicating the number of AIDs may be newly defined before the AID(s) subfield and may indicate the number of bits for the AIS(s) subfield.

Feedback type="1": This means a synchronization report request and may be newly defined.

"RU tone set subfield" is newly defined: An index of a set of RU tones to be used for each AID can be indicated by "RU tone set subfield".

According to the present embodiment, STAs that need to perform feedback can be designated and an RU tone set to be transmitted by each STA can also be designated, distinguished from the conventional 11 ax NDP feedback report poll trigger frame configuration.

Each STA can transmit a feedback in an HE TB NDP feedback PPDU format. Meanwhile, 6 tones from among 12 tones constituting a conventional RU tone set is used to indicate feedback status="0" and the remaining 6 tones are used to indicate feedback status="1". That is, only one 6-tone set between two 6-tone sets is used for transmission in the conventional technique. In the present disclosure, one STA can be configured to transmit all 12 tones.

Alternatively, a conventional buffer status report procedure may be reused. For example, in a procedure for transmitting a BSRP trigger frame to receive buffer status reports from STAs or receiving UL random access of STAs through a basic trigger frame, an NDP feedback report poll trigger frame, a BQRP trigger frame or the BSRP trigger frame, an AP can obtain synchronization information using TB PPDUs or NDP feedback PPDUs received from the STAs.

Upon reception of the TB PPDUs from the STAs, the AP can estimate timing differences between STAs and calculate relative timing offset values based on the timing differences. Then, the AP can notify each STA of an offset value through the HARQ trigger frame. For example, when the signal of the first arriving STA is "0", the AP can calculate offsets in such a manner that the signal of the next STA is "+0.01 us" and the signal of the next STA is "+0.05 us". On the contrary, the AP may determine an offset as "−0.01 us" or the like based on the signal of the last arriving STA. In this case, the AP can instruct all STAs to perform transmission at the timing of the latest STA in consideration of a distant STA or an STA with poor performance. Each STA can start transmission in consideration of an offset indicated by the AP when transmitting a UL MU HARQ A-PHDU.

(21) UL MU A-PHDU Configuration Method for Synchronization

In addition to the method of performing pre-signaling for synchronization, an A-PHDU may be configured by arranging null blocks or null symbols between blocks to be transmitted by STAs such that a problem such as signal overlap is not generated even if timing is off between STAs.

Figure 31:
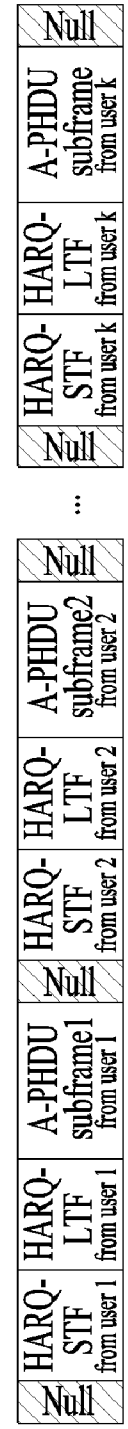
FIG. 31 illustrates a configuration of a UL MU A-PHDU including null blocks according to an embodiment of the present disclosure.

FIG. 31 illustrates a UL MU A-PHDU configuration including null blocks according to an embodiment of the present disclosure.

A specific time interval may be provided before/after signal transmission of STAs. Here, the time interval may be set within a PIFS (e.g., SIFS) such that a third party STA does not perform channel access in this time interval.

Alternatively, a dummy symbol may be used instead of the null symbol or symbols may be added before or after a PHDU packet using a longer CP, CP repetition or packet extension.

Proposal 2. Retransmission Determination Method in HARQ Operation

A HARQ operation may be defined as follows according to a transmitter and a receiver for convenience.

(1) DL SU HARQ operation: One AP/STA transmits HARQ data (e.g., (A)-PHDU supporting a HARQ process) to one STA.

(2) DL MU HARQ operation: One AP/STA transmits HARQ data to one or more STAs.

(3) UL SU HARQ operation: One STA transmits HARQ data to one AP/STA.

(4) UL MU HARQ operation: One or more STAs transmit HARQ data to one AP/STA.

Figure 32:
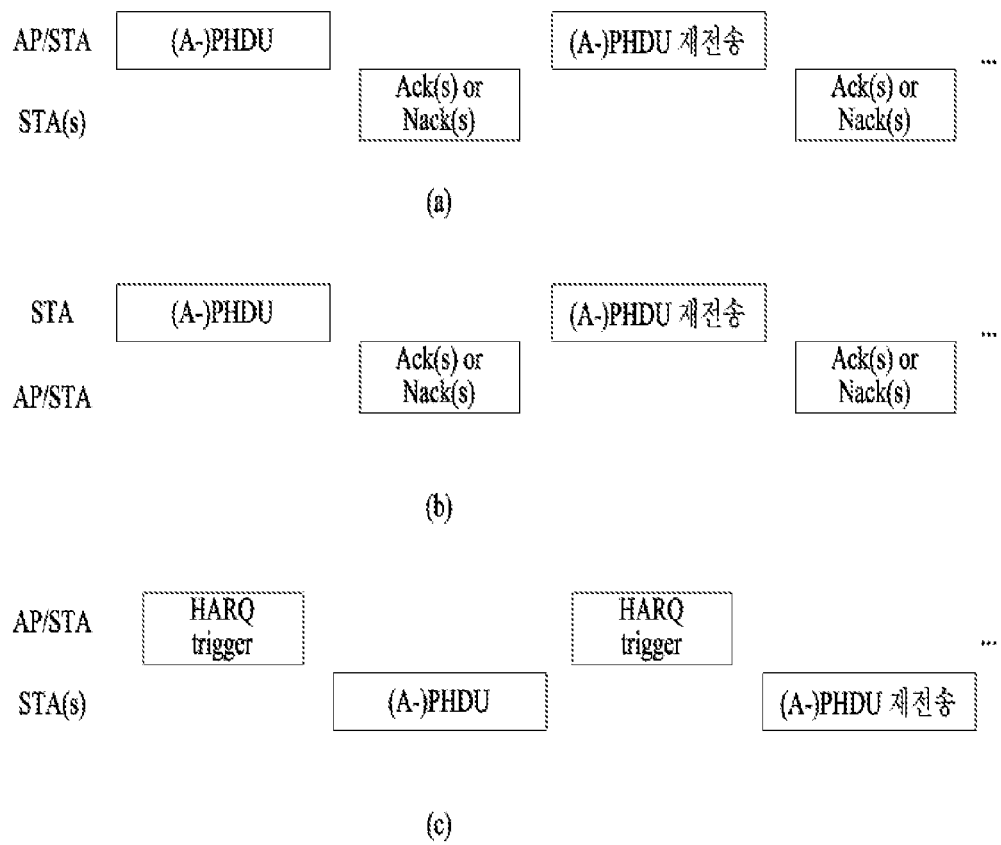
FIG. 32 illustrates a HARQ operation according to an embodiment of the present disclosure.

FIG. 32 illustrates a HARQ operation according to an embodiment of the present disclosure. In FIG. 32, illustration of information such as training symbols, the PHY header and a frame format is omitted for convenience. (a) of FIG. 32 corresponds to the DL SU/MU HARQ operation, (b) of FIG. 32 corresponds to the UL SU HARQ operation, and (c) of FIG. 32 corresponds to the UL MU HARQ operation.

In the cases of (1) to (3), an STA/AP that starts a HARQ operation transmits data and a receiver transmits ACK/NACK. In the case of (4), a recipient STA/AP first determines a data transmission method and positions of transmitting STAs and then HARQ data transmission starts.

Accordingly, PHDUs include a PHY header including STA IDs and configuration information in the case of (1) to (3), whereas PHDUs may not require an additional PHY header for STA IDs and configuration information because the STA IDs and configuration information have already been indicated in the HARQ trigger frame in the case of (4). In the case of (4), all ACK may be transmitted when all retransmissions have been successfully performed.

In addition, in the cases of (1) to (4), when all (A)-MPDU transmissions have been successfully performed independently of ACK/NACK transmission of a physical layer according to HARQ operations, a recipient STA/AP can transmit an additional MAC ACK message (e.g., an ACK frame, a BA frame or a MU BA frame) to transmitting AP/STAs.

Packet errors when the aforementioned HARQ operations are performed will be described.

In the case of (4), cases in which an AP/STA does not receive UL PHDU(s) as a response to a HARQ trigger frame may include the following two cases. One is a case in which STAs have transmitted PHDUs but the AP/STA does not receive the PHDUs and the other is a case in which STAs have not transmitted PHDUs due to a busy channel or the like. If the AP repeatedly requests retransmission by repeatedly transmitting a HARQ trigger frame even when a situation in which UL PHDUs cannot correctly received or STAs cannot transmit UL PHDUs due to a poor channel state continues, radio resources can be wasted.

To solve this problem, methods for determining whether to perform retransmission during the UL MU HARQ operation are proposed.

(i) According to a method, an AP can determine whether an STA has transmitted a UL PHDU by performing energy detection (ED) after HARQ trigger frame transmission. When an L-preamble is included in the UL PHDU, the AP may perform energy detection through the L-preamble or may perform energy detection using a HARQ-STF/LTF. If energy is detected (e.g., if energy of −82 dBm or more is detected), the AP can determine that the UL PHDU has been transmitted upon determining that the STA has transmitted a HARQ-STF/LTF. Even if the AP cannot data from a signal assumed as the UL PHDU, the AP can store the signal in a buffer for combining and request retransmission of the STA. Since the AP transmits a HARQ trigger frame upon determining a channel idle state, a probability of energy detection due to interference of other STAs immediately after the HARQ trigger frame can be regarded as very low. Accordingly, if energy is detected, the AP can assume that the energy is the requested UL PHDU.

(ii) According to another method, each STA can transmit a short PHY block prior to PHDU transmission. The AP can request retransmission when CRC check of the short PHY block has successfully performed but CRC check of PHDUs has failed. On the other hand, when CRC check of the short PHY block has failed, the AP may not request retransmission upon determining that a channel state is poor or an STA is in a state in which it cannot perform transmission. In this method, the AP can perform buffering only when there is a chance of decoding of data through combining instead of performing buffering in consideration of an ED result, distinguished from the above-described method. Accordingly, buffering overhead of the AP can be reduced, and retransmission overhead can also be reduced because the AP does not request retransmission of an STA upon determining that data cannot be correctly decoded even through combining. When both CRC check of the short PHY block and CRC check of PHDUs have been successfully performed, the AP can transmit ACK or end the corresponding HARQ operation without transmitting a HARQ trigger frame for requesting retransmission.

Next, the structure of the short PHY block will be described. The short PHY block may be a block having a data rate of MCS0 or lower. It is desirable that the short PHY block be transmitted at a data rate lower than that of PHDUs in consideration of HARQ combining gain. Since there is a problem that the data rate of the short PHY block needs to be additionally signaled when the data rate of the short PHY block varies, the data rate of the short PHY block can be set to a data rate corresponding to the lowest MCS0 or lower. The short PHY block is transmitted at a data rate lower than that of the PHDU because the AP can request retransmission only when decoding of the short PHY block has been successfully performed even if CRC check of PHDUs fails.

The short PHY block can conform to the configuration of the PHY header of the PHDU according to the aforementioned (1) to (3). Although the short PHY block may include all STA IDs and configuration information included in the HARQ trigger frame, this may be redundant and cause waste of resources. Accordingly, the short PHY block may be configured to include only minimum information as follows such that the AP can check CRC.

If the short PHY block includes CRC bits for CRC check and uses convolutional code, tail bits can also be included therein. Otherwise, the short PHY block may include the ID of each STA or bits in a designated pattern (e.g., signature bits) for conformation. For example, information of a total of 24 to 32 bits including CRC bits (8)+tail bits (8)+STA ID (8-16 bits) can be included in the short PHY block.

The short PHY block may conform to a SIG configuration. For example, 24-bit information can be encoded through BPSK 1/2 and then loaded on 1 symbol of 4 μs through 64-FFT. This method uses the 64-FFT format and thus may be useful when a UL MU HARQ packet includes an L-preamble (e.g., FIG. 33). To use an MCS lower than MCS0 for the short PHY block, the short PHY block may be repeatedly transmitted like RL-SIG.

Alternatively, L-SIG and RL-SIG may replace the short PHY block. This method differs from the conventional TB PPDU in that the L-preamble is transmitted at a fixed position for each STA instead of being commonly transmitted for all STAs.

When the L-preamble is not used, encoding can be performed in response to an FFT size of the PHDU without conforming to the conventional 64-FFT structure. For example, if 256-FFT is used for the PHDU as in 11ax and the number of data bits of the short PHY block is equal to or less than 26 bits, the short PHY block can be composed of 2 RUs of MCS0. If there is a remaining frequency band that is not used for the short PHY block, a PHDU can be loaded therein (e.g., FIG. 34). Further, to use an MCS lower than MCS0 for the short PHY block, the short PHY block can be repeated in the time domain or the frequency domain.

Figure 33:
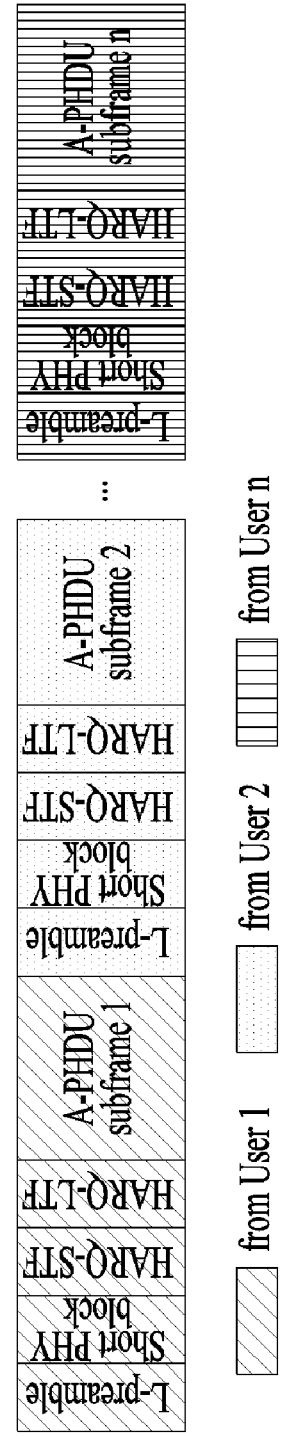
FIG. 33 illustrates a UL MU HARQ packet transmitted after a HARQ trigger frame according to an embodiment of the present disclosure.
Figure 34:
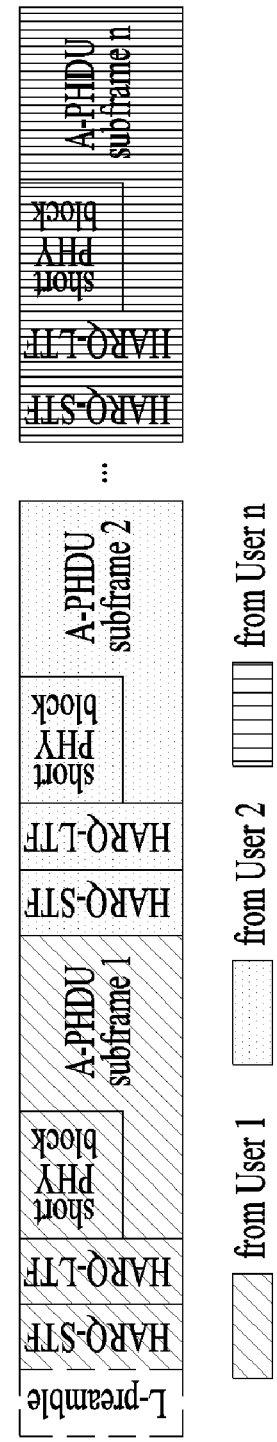
FIG. 34 illustrates a UL MU HARQ packet transmitted after a HARQ trigger frame according to another embodiment of the present disclosure.

Although cases in which PHDUs are multiplexed in the time domain are assumed in examples of FIG. 33 and FIG. 34, PHDUs may be multiplexed in the frequency domain. In the case of frequency domain multiplexing, each STA can perform transmission from the HARQ-STF in a frequency region designated for the corresponding STA.

Figure 35:
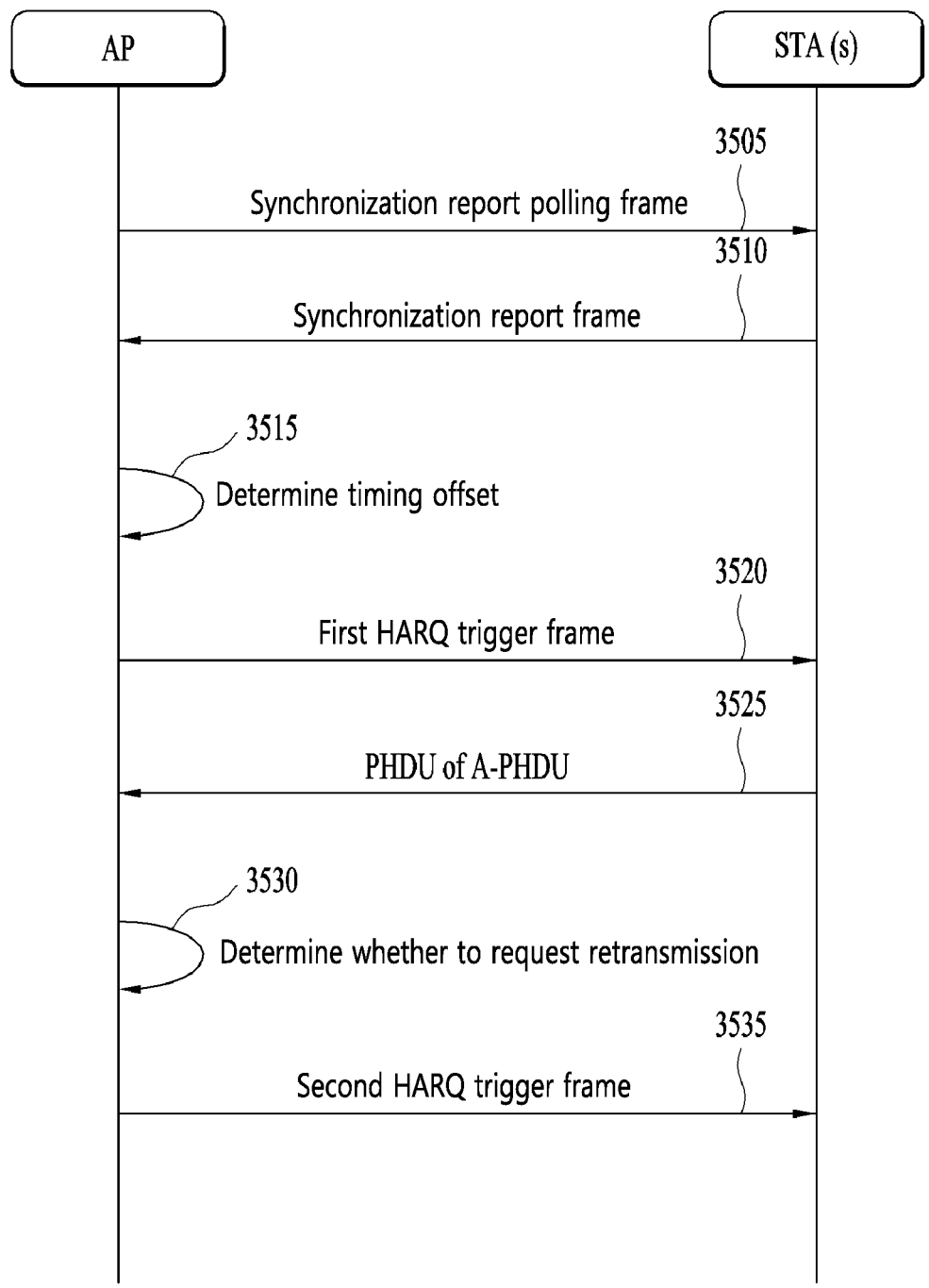
FIG. 35 illustrates a flow of a frame transmission/reception method based on a HARQ process according to an embodiment of the present disclosure.

FIG. 35 illustrates a flow of a frame transmission/reception method based on a HARQ process according to an embodiment of the present disclosure. FIG. 35 is exemplary implementation with respect to the above-described embodiments, the present disclosure is not limited to FIG. 35, and redundant description may be omitted. Although FIG. 35 illustrates only one STA, this is for convenience of description and those skilled in the art can understand that the method is applicable to a plurality of STAs.

Referring to FIG. 35, an AP can transmit a synchronization report polling frame for requesting synchronization report to a plurality of STAs (3505).

The AP can receive synchronization report frames from the plurality of STAs (3510).

The AP can determine a timing offset between the plurality of STAs (3515). The timing offset between the plurality of STAs can be determined based on differences of timing of arrival of synchronization report frames at the AP from the plurality of STAs.

An STA can receive a first HARQ trigger frame for triggering transmission of an aggregated (A)-PHDU that is an aggregate of PHY HARQ data units (PHDUs) (3520). The PHDU may be a physical layer (PHY) data transmission unit for the hybrid automatic repeat request (HARQ) process. The first HARQ trigger frame can include information on a timing offset between the STA and other STAs that transmit PHDUs in the A-PHDU.

The STA can transmit at least one PHDU at a timing designated for the STA in the A-PHDU based on the first HARQ trigger frame (3535). The STA can determine the timing designated for the STA using the timing offset information.

At least one PHDU transmitted by the STA and PHDUs transmitted by other STAs can be time-division-multiplexed in the A-PHDU.

A HARQ-short training field (STF) and a HARQ-long training field (LTF) can be attached to the head of the at least one PHDU transmitted by the STA.

Upon failing in decoding of a specific PHDU from among the PHDUs of the A-PHDUs, the AP can determine whether to send a request for retransmission of the specific PHDU to the corresponding STA (3530).

The STA can receive a second HARQ trigger frame from the AP (3535) and retransmit the at least one PHDU or transmit a new PHDU.

The STA may transmit a short PHY block prior to transmission of the at least one PHDU (3525) after reception of the first HARQ trigger frame (3520).

When the short PHY block has been successfully transmitted but transmission of the at least one PHDU has failed, retransmission of the at least one PHDU can be requested through the second HARQ trigger frame.

When transmission of the short PHY block has failed, retransmission of the at least one PHDU may not be requested through the second HARQ trigger frame even if transmission of the at least one PHDU fails.

The short PHY block can be encoded through a modulation and coding scheme (MCS) lower than an MCS used for the at least one PHDU.

Figure 36:
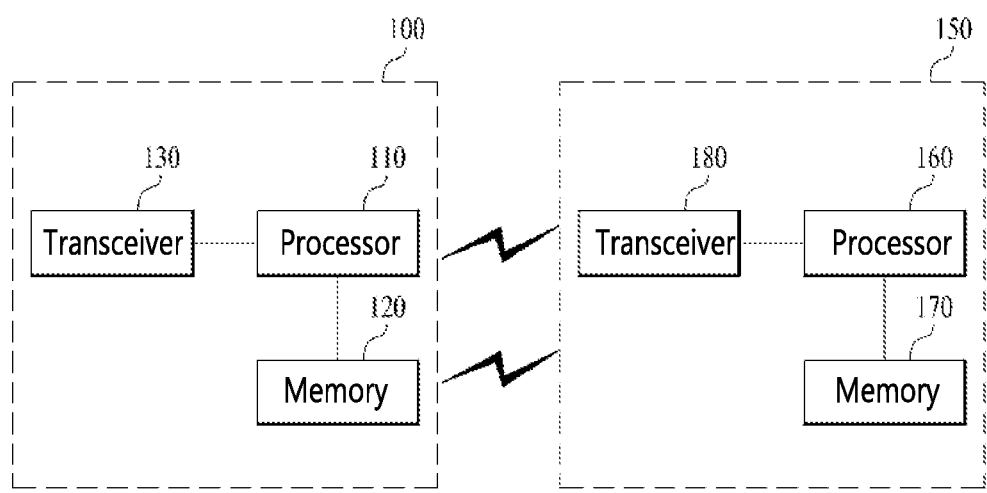
FIG. 36 is a diagram for describing a device according to an embodiment of the present disclosure.

FIG. 36 is a diagram for describing a device for implementing the aforementioned method.

A wireless device 100 of FIG. 36 can correspond to a specific STA in the above detailed description and a wireless device 150 can correspond to an AP in the above detailed description.

The STA 800 may include a processor 110, a memory 120 and a transceiver 130 and the AP 150 may include a processor 160, a memory 170 and a transceiver 180. The transceivers 130 and 180 can transmit/receive RF signals and can be executed in a physical layer such as IEEE 802.11/3GPP. The processors 110 and 160 can be executed in the physical layer and/or a MAC layer and connected to the transceivers 130 and 180. The processors 110 and 160 can perform the aforementioned UL MU scheduling procedure.

The processors 110 and 160 and/or the transceivers 130 and 180 may include an application-specific integrated circuit (ASIC), other chipsets, a logic circuit and/or a data processor. The memories 120 and 170 may include a read-only memory (ROM), a random access memory (RAM), a flash memory, a memory card, a storage medium and/or other storage units. When an embodiment is executed by software, the above-described method can be executed by a module (e.g., a process or a function) which executes the above-described functions. The module may be stored in the memories 120 and 170 and executed by the processors 110 and 160. The memories 120 and 870 may be provided inside or outside the processors 810 and 860 and connected to the processors 810 and 860 through known means.

The detailed description of the exemplary embodiments of the present disclosure has been given to enable those skilled in the art to implement and practice the present disclosure. Although the present disclosure has been described with reference to the exemplary embodiments, those skilled in the art will appreciate that various modifications and variations can be made in the present disclosure. Therefore, the present disclosure is not intended to limit the embodiments disclosed herein but to give a broadest range matching the principles and new features disclosed herein.

INDUSTRIAL APPLICABILITY

The present disclosure can be applied to various wireless communication systems including IEEE 802.11.

What is claimed is:

1. A method for transmitting/receiving frames by a receiving station (STA) in a wireless LAN (WLAN), the method comprising:
receiving a polling frame for a status report;
in response to the polling frame, transmitting a status report frame;
receiving a first trigger frame for triggering transmission of an aggregated physical layer data unit (A-PPDU) which includes an aggregate of hybrid automatic repeat request (HARQ) data units,
wherein the first trigger frame includes a common information field and a user info field, the common information field includes a bandwidth field related to a bandwidth of the A-PPDU and a power field related to a transmit power of the first trigger frame, the bandwidth field has a length of 2 bits, the power field has a length of 6 bits, the user info field includes an STA identifier (ID) field related to an ID of the receiving STA, a resource allocation field related to a frequency resource of the A-PPDU, and a modulation and coding scheme (MCS) field related to a MCS index of the A-PPDU, the STA ID field has a length of 12 bits, the resource allocation field has a length of 8 bits, and the MCS field has a length of 4 bits;
transmitting at least one of the HARQ data units at a timing designated for the receiving STA in the A-PPDU based on first trigger frame; and
retransmitting the at least one of the HARQ data units or transmitting a new A-PPDU upon reception of a second trigger frame,
wherein the first trigger frame includes information on a timing offset between the receiving STA and other STAs transmitting HARQ data units in the A-PPDU, and the receiving STA determines the timing designated for the receiving STA based on the timing offset, the timing offset is determined based on differences of timing of arrival of the status report frame of the receiving STA and status report frames of the other STAs at an access point (AP).

2. The method of claim 1, wherein the APPDU includes a short training field (STF) and a long training field (LTF).

3. A receiving station (STA) in a wireless LAN (WLAN), the method comprising:
a transceiver; and
a processor coupled to the transceiver,
wherein the processor is configured to:
receive a polling frame for a status report;
in response to the polling frame, transmit a status report frame;
receive a first trigger frame for triggering transmission of an aggregated physical layer data unit (A-PPDU) which includes an aggregate of hybrid automatic repeat request (HARQ) data units,
wherein the first trigger frame includes a common information field and a user info field, the common information field includes a bandwidth field related to a bandwidth of the A-PPDU and a power field related to a transmit power of the first trigger frame, the bandwidth field has a length of 2 bits, the power field has a length of 6 bits, the user info field includes an STA identifier (ID) field related to an ID of the receiving STA, a resource allocation field related to a frequency resource of the A-PPDU, and a modulation and coding scheme (MCS) field related to a MCS index of the A-PPDU, the STA ID field has a length of 12 bits, the resource allocation field has a length of 8 bits, and the MCS field has a length of 4 bits;
transmit at least one of the HARQ data units at a timing designated for the receiving STA in the A-PPDU based on first trigger frame; and retransmit the at least of the HARQ data units or transmitting a new A-PPDU upon reception of a second trigger frame, wherein the first trigger frame includes information on a timing offset between the receiving STA and other STAs transmitting HARQ data units in the A-PPDU, and the receiving STA determines the timing designated for the receiving STA based on the timing offset, the timing offset is determined based on differences of timing of arrival of the status report frame of the receiving STA and status report frames of the other STAs at an access point (AP).

4. The receiving STA of claim 3, wherein the APPDU includes a short training field (STF) and a long training field (LTF).

* * * * *